(12) United States Patent  (10) Patent No.: US 7,455,351 B2
Nakayama et al.  (45) Date of Patent: Nov. 25, 2008

(54) VEHICLE FRONT END STRUCTURE

(75) Inventors: Nobuyuki Nakayama, Hiroshima (JP);
Toshio Sakamoto, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 172 days.

(21) Appl. No.: 11/700,031

(22) Filed: Jan. 31, 2007

(65) Prior Publication Data

US 2007/0182174 A1  Aug. 9, 2007

(30) Foreign Application Priority Data

Feb. 15, 2006  (JP)  ............... 2006-037876
Feb. 20, 2006  (JP)  ............... 2006-042881
Feb. 28, 2006  (JP)  ............... 2006-052891

(51) Int. Cl.
B60J 7/00  (2006.01)
B60K 13/02  (2006.01)

(52) U.S. Cl. .................... 296/193.1; 180/68.6

(58) Field of Classification Search ............. 296/193.1, 296/193.09, 203.02, 187.09; 293/115; 180/68.6
See application file for complete search history.

(56) References Cited

U.S. PATENT DOCUMENTS

2002/0129981 A1* 9/2002 Satou ............... 180/68.6

FOREIGN PATENT DOCUMENTS

| JP | 11-314552 | 11/1999 |
| JP | 2001-082146 | 3/2001 |
| JP | 2002-321576 | 11/2002 |

* cited by examiner

Primary Examiner—Joseph D Pape

(57) ABSTRACT

A front end structure for a vehicle comprises: a front bumper face; a shroud upper disposed to the rear of the front bumper face; a bumper beam disposed below the shroud upper to span the front ends of right and left front side frames; a center stay made of metal and spanning the shroud upper and the bumper beam; and a front grille supported at the upper side to the shroud upper and supported at the lower side to the front bumper face, the front grille is inclined so that the lower side is located frontwardly of the upper side, and the center stay is integrally provided with a grille support having a root end connected to the center stay and an abutment supporting part extending from the root end towards the bottom of the front grille to support the front grille from below. Alternatively, a front end structure for a vehicle comprises: a front bumper face; a shroud disposed to the rear of the front bumper face and including at least an upper part and right and left side parts; a front grille supported at the upper side to the shroud, supported at the lower side to the front bumper face and inclined so that the lower side is located frontwardly of the upper side; and a front grille support member including right and left mounting parts mounted to the right and left side parts of the shroud, respectively, and a shelf connecting the right and left mounting parts, formed to protrude frontward at a spanning part thereof connecting the right and left mounting parts and supporting the front grille from below.

25 Claims, 29 Drawing Sheets

VEHICLE FRONT END STRUCTURE

CROSS-REFERENCES TO RELATED APPLICATIONS

This application claims priority under 35 USC 119 to Japanese Patent Applications Nos. 2006-42881 filed on Feb. 20, 2006, 2006-37876 filed on Feb. 15, 2006 and 2006-52891 filed on Feb. 28, 2006, the entire contents of all of which are incorporated herein by reference.

BACKGROUND OF THE INVENTION (a) Field of the Invention

This invention relates to a front end structure for a vehicle and particularly relates to a front grille support structure.

(b) Description of the Related Art

A front grille for a vehicle is provided as an air vent in the front end of the vehicle above a front bumper. In a known mounting structure for a front grille, such as disclosed in Published Japanese Patent Application No. H11-314552, a front grille is supported from above by suspension from a shroud upper for holding a radiator and other peripheral components and supported from below by a bumper face of a front bumper. In such a structure, in order to prevent the bumper face of relatively low rigidity from largely deforming, the front grille is supported mainly by suspension from the shroud upper.

In another known mounting structure for a front grille as disclosed in Published Japanese Patent Application No. 2001-82146, unlike the above structure in which a front grille is mounted to a shroud separate therefrom, a front grille is integrally formed with a shroud. Such a structure, however, imposes limitations particularly on the design for the front grille. Therefore, commonly, as in the former structure, the front grille is molded separately from the shroud and then mounted thereto.

Large vehicles have a relatively large front grille. If the front grille has an inclined configuration so that its lower side is located frontwardly of its upper side, such a support structure consisting essentially of suspending the front grille from above as in the former structure cannot sufficiently bear the weight of the front grille. In this case, a heavy load is placed on the front bumper of relatively low rigidity for supporting the front grille from below.

Thus, the bumper face yields to the weight of the front grille and deforms downward, whereby the front grille hangs down. Front grilles are commonly formed substantially in an arcuate shape that protrudes frontward as viewed from above. Therefore, particularly, their widthwise middle portion is likely to sag as compared to their widthwise ends supported in the vicinities of frames with high rigidity.

If only part of the front grille thus hangs down, an unsightly gap is created between the front grille and a bonnet located thereabove, which disfigures the vehicle front end.

SUMMARY OF THE INVENTION

An object of the present invention is to provide a vehicle front end structure that has a large front grille inclined so that its lower side is located frontwardly of its upper side and formed substantially in an arcuate shape as viewed from above, in which the front grille can be prevented from hanging down owing to its own weight.

In an aspect of the present invention, a front end structure for a vehicle comprises: a front bumper face; a shroud upper disposed to the rear of the front bumper face; a bumper beam disposed below the shroud upper to span the front ends of right and left front side frames; a center stay made of metal and spanning the shroud upper and the bumper beam; and a front grille supported at the upper side to the shroud upper and supported at the lower side to the front bumper face, the front grille being inclined so that the lower side is located frontwardly of the upper side. Further, the center stay is integrally provided with a grille support including a root end connected to the center stay and an abutment supporting part extending from the root end towards the bottom of the front grille to support the front grille from below.

With this configuration, the front grille, having the upper side supported to the shroud upper and the lower side supported to the bumper face and inclined so that the lower side is located frontwardly of the upper side, is supported from below also by the grille support extending from the center stay. Therefore, the front grille can be prevented from hanging down owing to its own weight. In addition, since the grille support is integrally provided with the center stay, this avoids the increase in the number of assembly parts and thereby prevents the assemblability of the vehicle front end from being deteriorated.

In the above configuration, it is preferable that the front end structure further comprises a bumper retainer disposed so that at least part thereof abuts on the back of the front bumper face, the bumper retainer being fixedly connected at the lower side to the front bumper face, the bumper retainer abutting at the upper side against the front grille from below to support the front grille, wherein the grille support is configured so that the abutment supporting part abuts on an upper part of the bumper retainer from below to support the bumper retainer.

Thus, the rigidity of the front bumper face can be enhanced by the bumper retainer. Therefore, even if the load of the front grille is placed on the front bumper face, the front bumper face can surely be prevented from sagging.

In addition, a surface of the bumper retainer may be provided with a plurality of vertical ribs each extending in a front-to-rear direction of the vehicle and arranged in a widthwise direction of the vehicle to come into contact with the back of the front bumper face and a shelf connecting the rear ends of the vertical ribs in the widthwise direction of the vehicle, and the front grille may be supported from below by the shelf.

Thus, the rigidity of the bumper retainer can be enhanced by the plurality of vertical ribs without extremely increasing the weight of the bumper retainer, thereby providing more secure support of the front bumper face and the front grille. Furthermore, since the plurality of vertical ribs are connected to each other by the shelf extending in the vehicle widthwise direction, this enhances the rigidity of each vertical rib and thereby further enhances the rigidity of the bumper retainer.

Furthermore, in the above configuration, it is preferable that the bumper beam is disposed frontwardly of the shroud upper, the center stay is disposed so that a bumper beam side mounting part thereof is located frontwardly of a shroud upper side mounting part thereof, and the grille support extends upward from the vicinity of the bumper beam side mounting part of the center stay.

In this case, since the grille support extends upward from the vicinity of the bumper beam side mounting part of the center stay and supports the front grille from below, the grille support undergoes load in its compressive direction in which it has a relatively high rigidity, thereby supporting the front grille with higher reliability. Furthermore, since the grille support extends from the bumper beam side mounting part of the center stay closest to the front grille to under the front grille, the grille support can be short, thereby enhancing the rigidity of the grille support. This improves the stability for the grille support to support the front grille.

The center stay may be integrally provided with an auxiliary support that connects the shroud upper side mounting part of the center stay to part of the grille support located between the abutment supporting part and the root end. Thus, the grille support and the center stay, in addition to their connection in the vicinity of the bumper beam side mounting part at the lower end of the center stay, can be connected to each other also at the upper side of the center stay by the auxiliary support. This surely prevents the grille support from largely changing its position in the vehicle front-to-rear direction with respect to the center stay. In other words, the rigidity of the grille support in the front-to-rear direction can be enhanced.

The grille support preferably further includes a guide located frontwardly of the abutment supporting part and extending frontward and downward. Thus, in assembling the front grille or the like to the grille support, the need is eliminated to assemble it while visually checking the grille support, thereby improving the assemblability.

The auxiliary support preferably includes a second guide located frontwardly of part thereof connected to the grille support and extending frontwardly and upwardly of the abutment supporting part of the grille support. The provision of the second guide in the auxiliary support facilitates the positioning of the front grille into a vertically specified position. This further improves the assemblability of the front grille.

In the above configuration, the auxiliary support may further include a restriction wall located frontwardly of part thereof connected to the grille support and extending in the front-to-rear direction at a predetermined distance upwardly from the abutment supporting part of the grille support. Thus, even if the counterpart disposed to abut on the abutment supporting part relatively moves upward during travel on a rough road, the restriction wall can restrict the upward movement of the counterpart. Therefore, the front grille or other counterparts can surely be prevented from falling out of position.

Furthermore, the shroud upper side mounting part of the center stay may have right and left flanges extending to the right and left, respectively, from a vertically extending body of the center stay, and the auxiliary support may be formed in the shape of the letter V in top view, one of distal ends of the auxiliary support being fixed to one of the right and left flanges, the other distal end of the auxiliary support being fixed to the other of the right and left flanges, a root end of the auxiliary support being fixed to the grille support. Thus, the grille support is restricted from falling out of position not only in the front-to-rear direction but also in the lateral direction relative to the center stay by the auxiliary support formed in the shape of the letter V in top view. Therefore, the horizontal rigidity of the grille support can be enhanced.

The shroud upper may be a part of a resin shroud to which a bonnet lock is mounted using a jig, and the center stay may be positioned to the shroud by a center stay positioning part provided on the jig. Thus, the center stay is positioned to the shroud upper with high accuracy. Therefore, the grille support integrally provided with the center stay can be accurately positioned to the front grille supported to the shroud upper, thereby surely supporting the front grille. In addition, since the center stay is positioned by the jig for mounting the bonnet lock, this eliminates the need for a special jig for the center stay and thereby providing reduced production cost.

Alternatively, the shroud upper may be a part of a resin shroud to which a bonnet lock is mounted using a jig, and the shroud upper side mounting part of the center stay may be fastened together with the bonnet lock. In other words, if the mounting holes in the center stay are machined with high precision, the positioning accuracy of the center stay can be enhanced, without using any special jig for positioning the center stay, by fastening the shroud upper side mounting part together with the bonnet lock positioned by the jig. This provides improved assemblability.

Furthermore, an impact sensor may be mounted to the shroud upper side mounting part of the center stay. If an impact sensor is mounted to the shroud upper side mounting part of the center stay in the above configuration in which the center stay is integrally provided with the grille support, the impact sensor can detect not only load applied to the bumper beam and transmitted through the bumper beam side mounting part of the center stay but also load applied to the front grille and transmitted through the grille support. This provides more accurate detection of a collision.

When applied impact load is transmitted through the grille support to the above configuration in which the center stay is provided with an impact sensor, the impact load might cause disturbance in the impact sensor. In such a case, it is preferable that at least one of the grille support and the auxiliary support has a vulnerable site vulnerable to load in the front-to-rear direction.

Thus, the grille support is easily deformed rearward at its vulnerable site by the applied impact load. This prevents applied load from being transmitted to the impact sensor through the grille support as it is.

In another aspect of the present invention, a front end structure for a vehicle comprises: a front bumper face; a shroud disposed to the rear of the front bumper face and including at least an upper part and right and left side parts; a front grille supported at the upper side to the shroud and supported at the lower side to the front bumper face, the front grille being inclined so that the lower side is located frontwardly of the upper side; and a front grille support member including right and left mounting parts mounted to the right and left side parts of the shroud, respectively, and a shelf connecting the right and left mounting parts, formed to protrude frontward at a spanning part thereof connecting the right and left mounting parts and supporting the front grille from below.

With this configuration, the front grille, having the upper side supported to the shroud upper and the lower side supported to the bumper face and inclined so that the lower side is located frontwardly of the upper side, is supported from below also by the shelf of the front grille support member mounted to the right and left side parts of the shroud. Therefore, the front grille can be prevented from hanging down owing to its own weight. In addition, since the front grille support member is fixedly mounted to the right and left side parts of the shroud and its shelf entirely supports the front grille, it can surely support the front grille from below. Therefore, the front grille can be prevented from hanging down and thereby disfiguring the vehicle front end.

In the above configuration, it is preferable that the top of the shelf is provided with a plurality of ribs extending in a front-to-rear direction of the vehicle and arranged in a widthwise direction of the vehicle and a second shelf connecting the rear ends of the ribs in the widthwise direction of the vehicle, and that the front grille is supported from below by the second shelf. The provision of the plurality of ribs on the shelf of the front grille support member can enhance the rigidity of the shelf. Furthermore, since the rear ends of the ribs are connected in the vehicle widthwise direction by the second shelf, the strength of each rib can be increased, which further enhances the rigidity of the shelf of the front grille support member. In addition, since the front grille is supported by the second shelf, the entire front grille can be supported from below, thereby improving the supporting stability. Furthermore, the provision of the plurality of ribs extending in the front-to-rear direction on the shelf provides a line contact of the ribs with the front grille. This eliminates the need to form the front grille support member with high dimensional accuracy and thereby improves the productivity of the front grille support member.

The front bumper face may extend frontward and downward from in front and the horizontal level of the shelf, and the front grille support member may be positioned with the front end of the shelf in the vicinity of the back of the front bumper face and further include a bumper face support extending frontward and downward from the front end of the shelf along the back of the bumper face. The provision of the bumper face support enables not only the front grille to be supported but also the bumper face to be supported from behind, thereby improving the rigidity of the bumper face. In addition, since the front grille support member includes the bumper face support integrally provided therewith, there is no need to provide an additional separate member, which avoids significant increase in production cost.

Furthermore, the front grille support member may further include right and left side walls connecting both the widthwise ends of the bumper face support to the right and left mounting parts. The provision of the side walls enhances the rigidity of the front grille support member in the front-to-rear direction and also enhances the rigidity in a torsional direction and in the vehicle widthwise direction.

The side walls and the mounting parts may be provided with reinforcement ribs extending in the front-to-rear direction of the vehicle across each associated pair of said side wall and said mounting part. Thus, each side wall and the associated mounting part are also connected by the reinforcement rib and thereby reinforced, which further enhances the rigidity of the front grille support member.

Furthermore, the front grille support member preferably further includes a lower wall extending rearward from the lower end of the bumper face support and connected at its widthwise ends to the right and left side walls. Thus, the front grille support member has a hexahedral shape opening rearward, which further enhances the rigidity of the front grille support member.

The front grille support member may be formed in a cross section resembling a lateral letter U opening rearward by the shelf, the bumper face support and the lower wall and further include inside reinforcement ribs provided on the inside across the shelf, the bumper face support and the lower wall to extend in the front-to-rear direction of the vehicle.

Thus, the shelf, the bumper face support and the lower wall of the front grille support member are also connected by the inside reinforcement ribs and thereby reinforced, which further enhances the rigidity of the front grille support member.

The front grille support member may further include a bumper beam cover provided at a predetermined distance downward from the lower wall to form an air inlet under the lower wall and a connecting part connecting the bumper beam cover and the lower wall. Thus, the front grille support member enables the air inlet to be formed behind the bumper face and concurrently enables the bumper beam cover to cover the top of the bumper beam, which improves the appearance of the bumper beam and its surroundings viewed through the opening of the bumper face. In addition, since the bumper beam cover is connected through the connecting part to the lower wall of the front grille support member, this enhances the rigidity of the lower wall and the bumper face support located on the front side of the lower wall. Here, the predetermined distance means a distance that can create a large air inlet enough to take in air during travel between the lower wall and the bumper beam cover.

It is preferable that a shock absorbing material is disposed on the front side of the bumper beam and supported at the rear side to the bumper beam, and that the bumper beam cover is formed so that the front end thereof is located to the front end of the shock absorbing material, the front end of the bumper beam cover being provided with a plurality of engagement parts extending downward and engaged to the front side of the shock absorbing material Thus, since the engagement parts provided at the front end of the bumper beam cover are engaged to the front side of the shock absorbing material supported at its rear side to the front side of the bumper beam, the front side of the shock absorbing material can be supported without providing another support member, which surely prevents the shock absorbing material from falling frontward owing to its own weight.

A cushion may be disposed between the bumper beam and the bumper beam cover. The disposition of a cushion between the bumper beam and the bumper beam cover enables the cushion to absorb swings of the bumper beam cover due to vibrations. Therefore, the bumper beam cover can be surely prevented from hitting the bumper beam and thereby producing noises.

The front grille support member may further include right and left seal plates extending upward from both the widthwise ends of the bumper beam cover to form right and left vertical walls between the right and left side parts of the shroud and the front bumper face. Thus, the seal plates function as partitions for dividing the space between the shroud and the front bumper face in the widthwise direction. Therefore, it can be prevented that the back flow of hot air from the engine room reaches in front of the shroud and that the hot air is then taken in together with outside air. In addition, since the seal plates are provided on the front grille support member, this eliminates the need to provide any special member. Furthermore, since the lower ends of the seal plates are connected to each other by the bumper beam cover, this prevents the seal plates from falling down in the vehicle widthwise direction.

Furthermore, an opening formed in the front bumper face may be provided with a fin extending vertically, and the front grille support member may further include: a face support spanning the right and left mounting parts and supporting a face part located above the opening of the front bumper face; and a connecting part provided in the same widthwise location as the fin and connecting the bumper beam cover and the face support. The provision of the face support allows the face support to support the face part above the opening of the front bumper face, thereby enhancing the rigidity of the face part. The connection between the face support and the bumper beam cover covering the top of the bumper beam enhances the rigidity of the face support itself. In addition, since the connecting part connecting the face support and the bumper beam cover is provided in the same widthwise location as the fin provided in the opening of the front bumper face, this minimizes the air flow resistance against the connecting part and the fin part.

DETAILED DESCRIPTION OF THE INVENTION

Preferred embodiments of the present invention will be described below with reference to the drawings. The following description of the preferred embodiments is merely illustrative in nature and is not intended to limit the scope, applications and use of the present invention.

Embodiment 1

Figure 1:
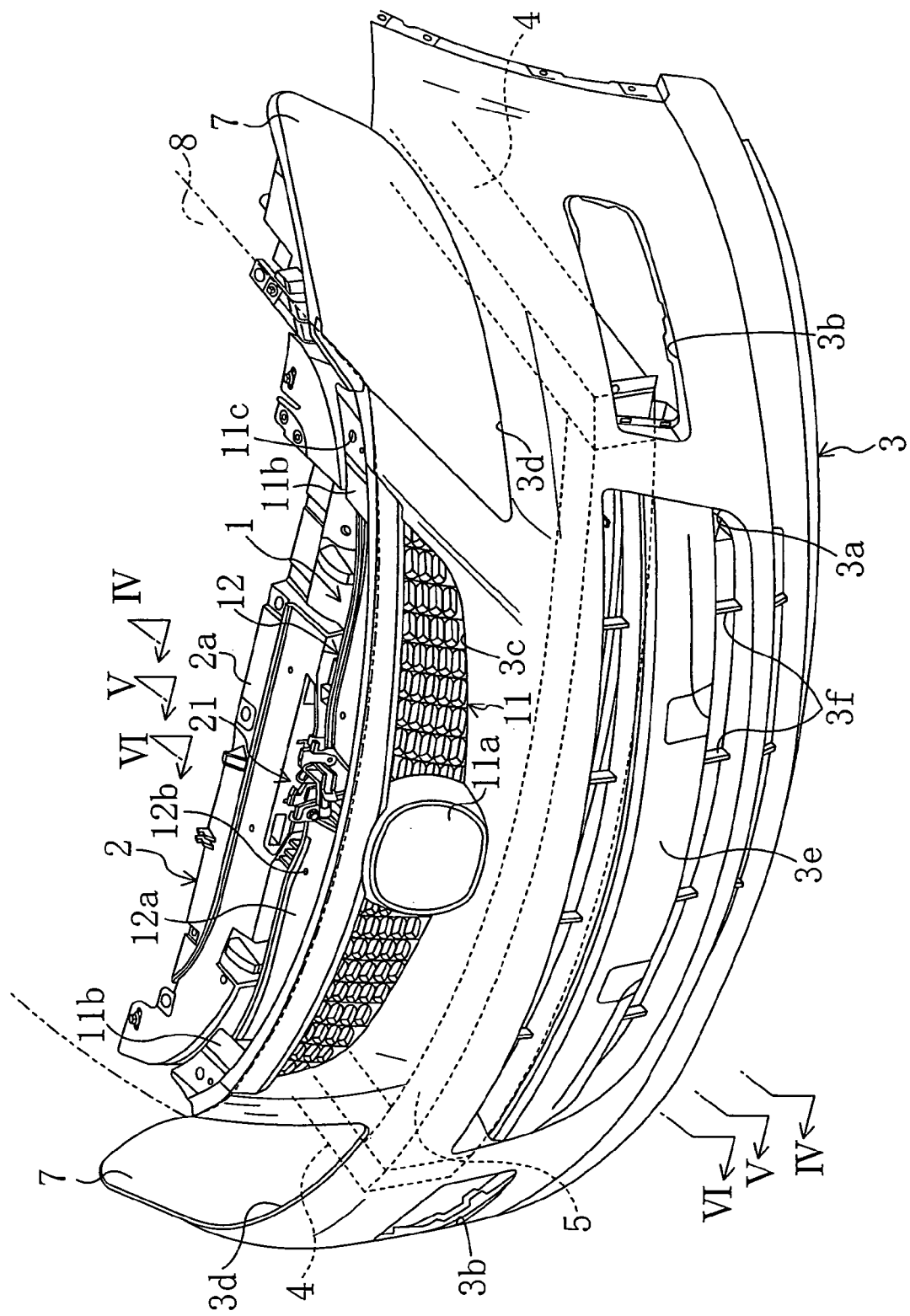
FIG. 1 is a perspective view showing a schematic structure of a vehicle front end according to Embodiment 1 of the present invention.

FIG. 1 shows a vehicle front end structure according to Embodiment 1 of the present invention. Specifically, FIG. 1 schematically illustrates essential components of the vehicle front end structure, such as a front grille 1, a shroud panel 2 and a bumper face 3 (a front bumper face). The rest of the vehicle front end structure, such as an engine, is not given in the figure.

The bumper face 3 is constituted by a resin plate material molded in a given shape and disposed to cover the front end of the vehicle. A lower part of the bumper face 3 has a bumper face opening 3a formed as a vent in the middle thereof, and has fog lamp openings 3b and 3b which are formed to the right and left of the bumper face opening 3a and in which their associated fog lamps are placed. The top end of the bumper face 3 has a grille recess 3c formed in the middle thereof and the front grille 1 is placed in the grille recess 3c. The top end of the bumper face 3 also has head lamp recesses 3d and 3d formed to the right and left of the grille recess 3c and their associated head lamps are placed in the head lamp recesses 3d and 3d. The bumper face 3 also has an opening formed below the bumper face opening 3a.

The bumper face opening 3a is located frontwardly of a bumper beam 5 connecting the front ends of front side frames 4 and 4 that are located on the right and left of the vehicle body in the vehicle widthwise direction and extend in the front-to-rear direction of the vehicle. In the opening 3a, a cover 3e is placed to extend in the vehicle widthwise direction and cover the front side of the bumper beam 5. The bumper face opening 3a is provided with a plurality of ribs 3f, 3f, . . . extending vertically from its periphery to the cover 3e, thereby enhancing the rigidity of the cover 3e. Furthermore, an urethane material 10 for shock absorption is disposed between the front side of the bumper beam 5 and the cover 3e in the bumper face opening 3a (see FIGS. 2 to 5).

As shown in FIGS. 2, 4 to 6 and 7, the front grille 1 includes: a grille body 11 inclined so that its lower side is located frontwardly of its upper side and formed in an arcuate shape in top view so that its widthwise middle part protrudes frontward; and a mounting part 12 attached to the rear of the grille body 11 and connected to the shroud panel 2. The grille body 11 and the mounting part 12 are fastened to each other by bolts (not shown). Furthermore, the grille body 11 is formed in the widthwise middle with an emblem part 11a designed in the shape of a corporate emblem of the maker.

Figure 4:
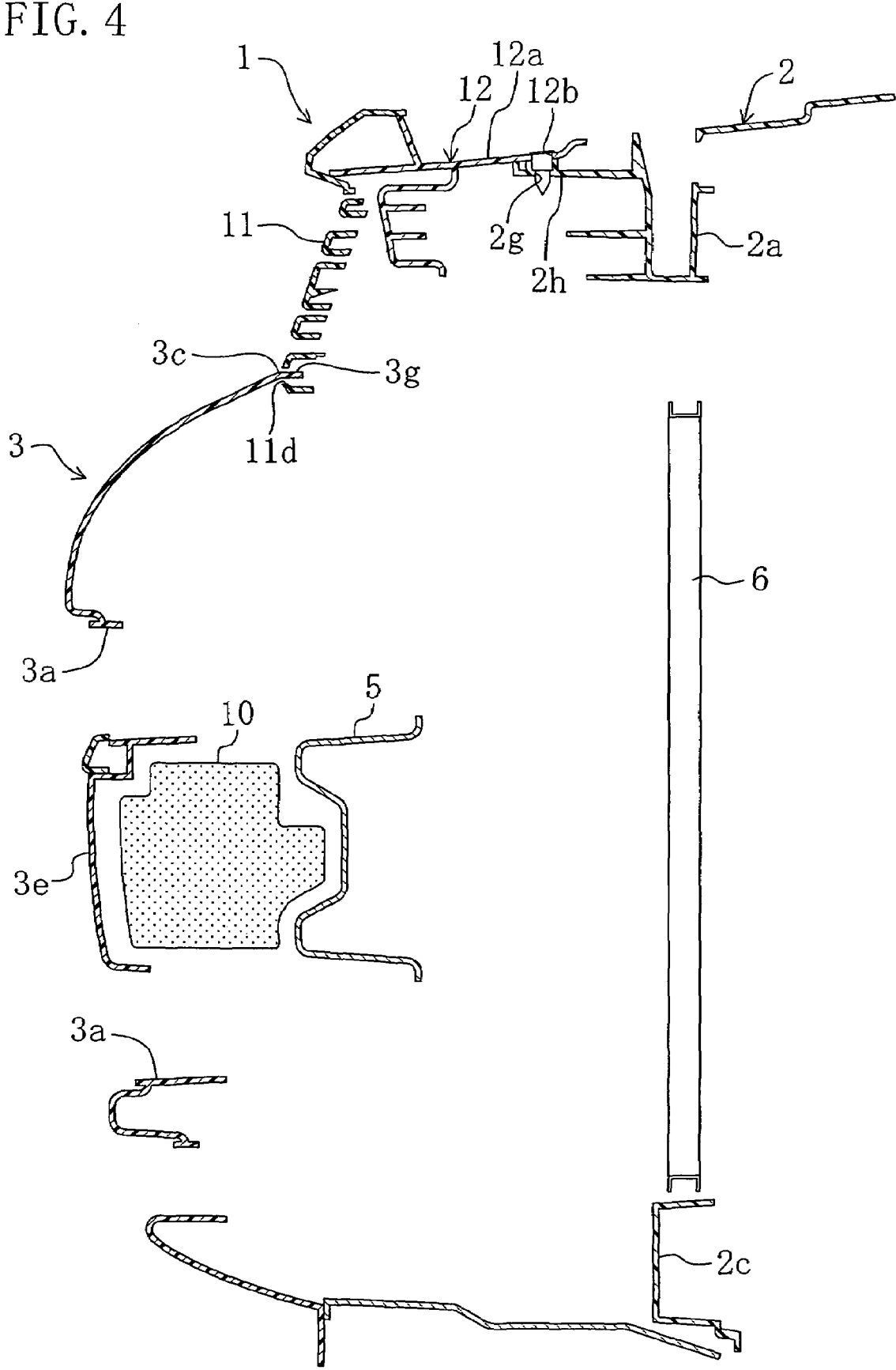
FIG. 4 is a cross-sectional view taken along the line IV-IV in FIG. 1.
Figure 5:
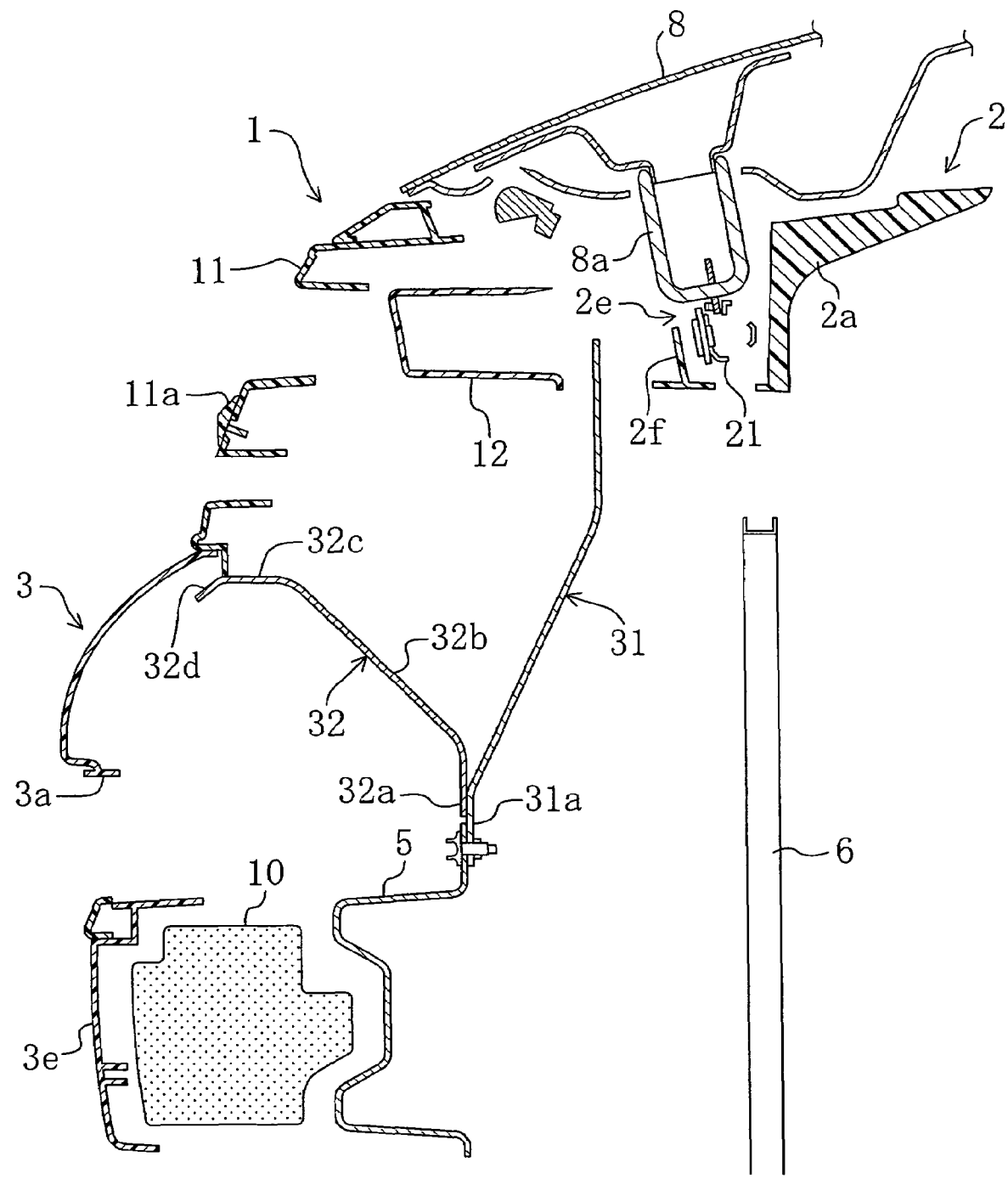
FIG. 5 is a cross-sectional view taken along the line V-V in FIG. 1.

As shown in FIG. 4, the front grille 1 is connected at the upper side with a shroud upper part 2a of the shroud panel 2 and engaged at the lower side with the periphery of the grille recess 3c of the bumper face 3.

Specifically, the mounting part 12 of the front grille 1 has an upper plate 12a formed along the grille body 11 of arcuate shape as viewed from above. The upper plate 12a has a plurality of (two in this embodiment) mounting holes 12b and 12b formed in the vicinity of the widthwise middle thereof towards the rear of the vehicle to connect the front grille 1 to the shroud upper part 2a. The front grille 1 and the shroud panel 2 are connected to each other by inserting bolts into the mounting holes 12b and 12b and the after-mentioned associated mounting holes 2g and 2g formed in the shroud panel 2 and fastening them by the bolts.

Figure 2:
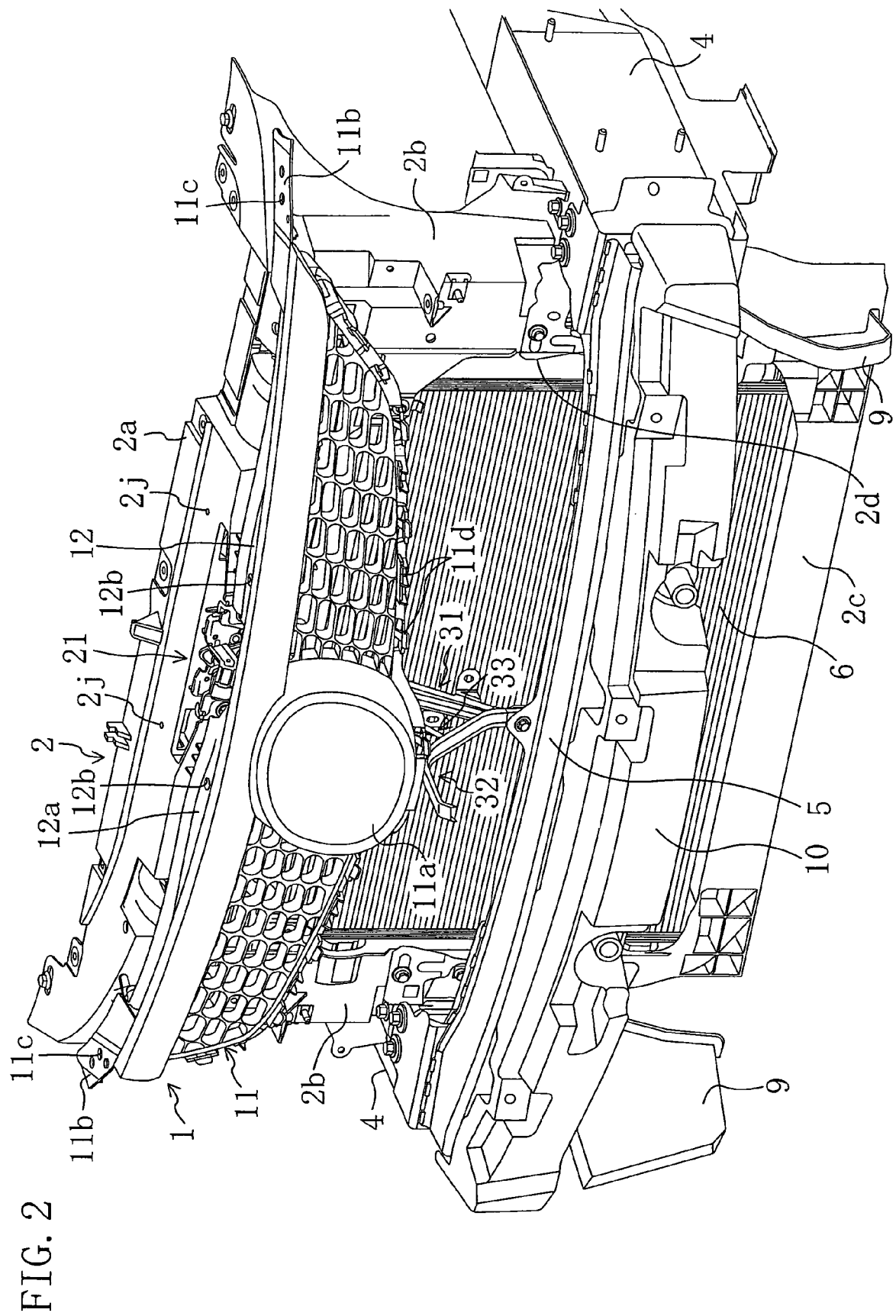
FIG. 2 is a perspective view showing the schematic structure of the vehicle front end from which a bumper face is removed.
Figure 7:
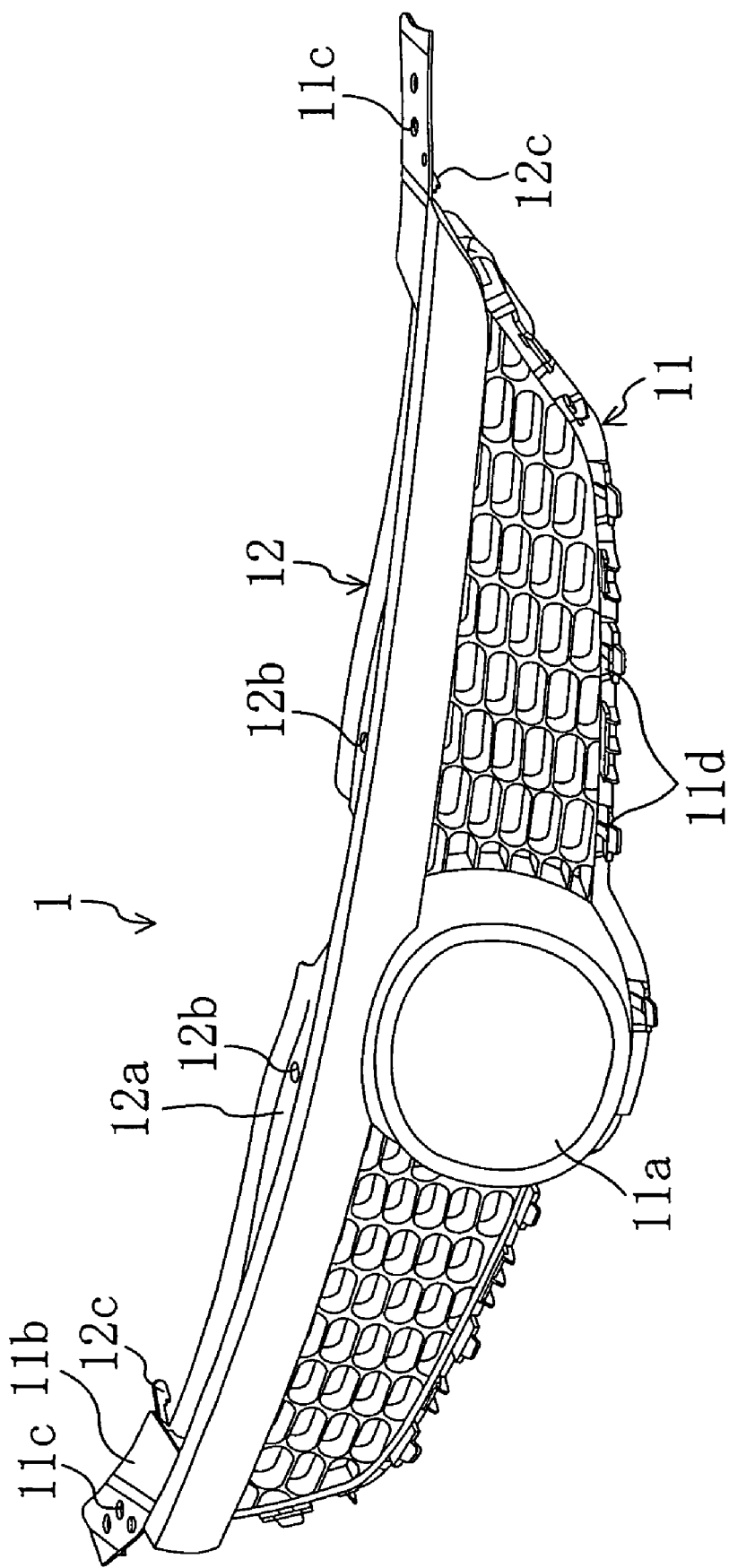
FIG. 7 is a perspective view of the front grille.

As shown in FIGS. 1, 2 and 7, the grille body 11 of the front grille 1 is provided at the right and left ends with extension connecting parts 11b and 11b extending towards the rear of the vehicle. Each extension connecting part 11b is formed with a mounting hole 11c. The front grille 1 is connected at both ends to the vehicle body by inserting bolts into the mounting holes 11c and the mounting holes (not shown) in the bumper face 3 and the mounting holes (not shown) in the head lamps 7 and 7 and fastening the front grille 1 by the bolts.

As shown in FIGS. 2 and 7, the grille body 11 is formed at the lower end with a plurality of holes 11d, 11d, . . . arranged in the vehicle widthwise direction. The holes 11d, 11d, . . . are configured to engage with associated projections 3g, 3g, . . . formed on the periphery of the grille recess 3c in the bumper face 3 (see FIG. 4). Specifically, the periphery of the grille recess 3c in the bumper face 3 is formed with a plurality of projections 3g, 3g, . . . arranged to curve to the rear of the vehicle in association with the respective positions of the plurality of holes 11d, 11d, . . . formed at the lower end of the grille body 11. The projections 3g, 3g, . . . are engaged in the associated holes 11d, 11d, . . . .

Figure 3:
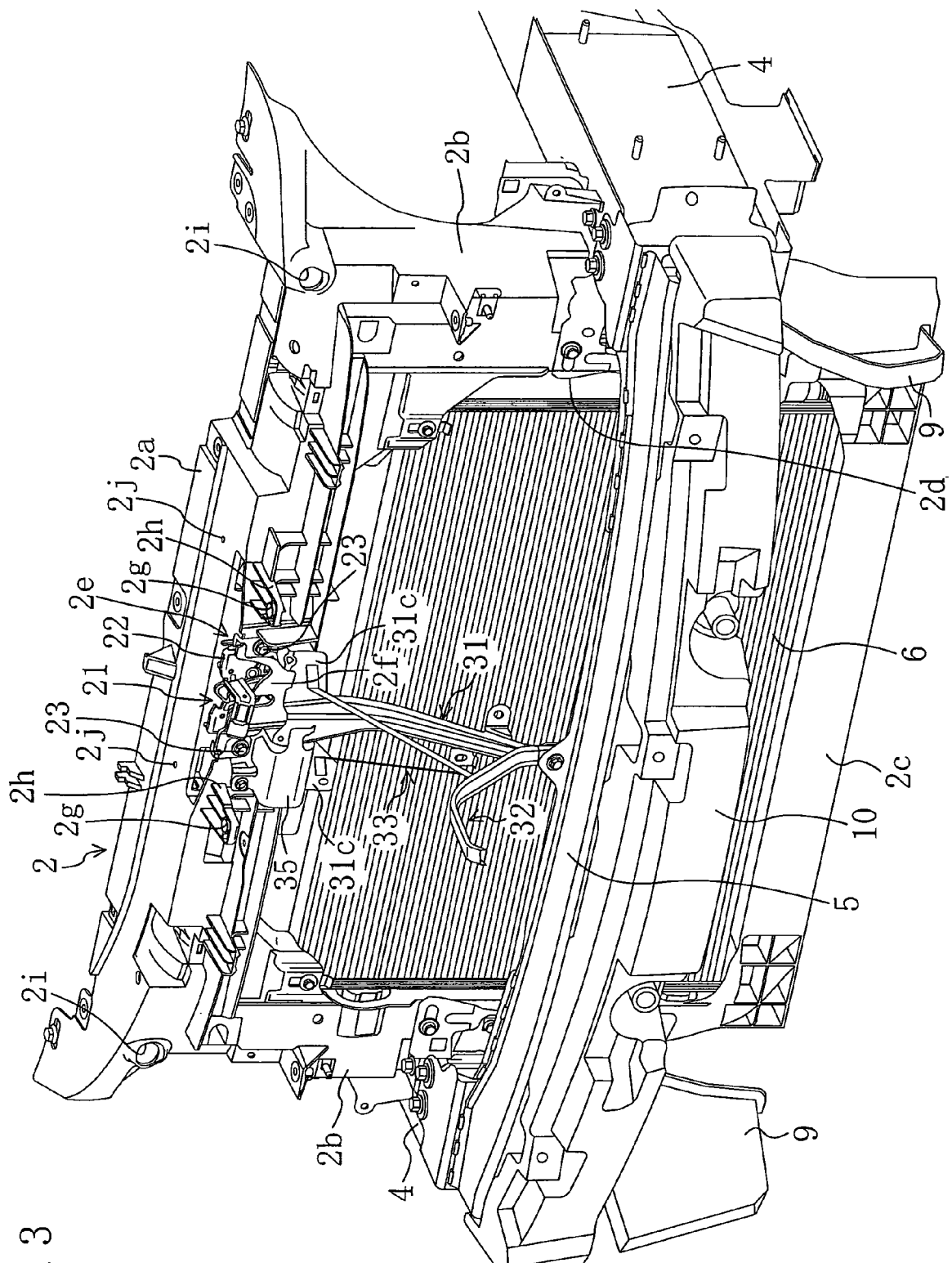
FIG. 3 is a perspective view of the vehicle front end in which a front grille is removed from the state shown in FIG. 2.

The shroud panel 2 is a frame integrally molded from a resin material containing a reinforcing material, such as glass fibers, by injection molding. As shown in FIGS. 2 and 3, the shroud panel 2 includes the shroud upper part 2a extending in the vehicle widthwise direction, vertical members 2b and 2b extending downward from the right and left ends of the shroud upper part 2a and a shroud lower part 2c extending in the vehicle widthwise direction to connect both the lower ends of the vertical members 2b and 2b and has an opening 2d defined by the shroud upper part 2a, the vertical members 2b and 2b and the shroud lower part 2c.

A radiator 6 is disposed as a cooler rearwardly of the shroud panel 2 to be presented to the opening 2d and is fixed to the shroud panel 2. The shroud panel 2 is fixedly connected at the right and left vertical members 2b and 2b to the right and left front side frames 4 and 4, respectively, whereby the radiator 6 is placed upright on the vehicle body so that its front face is exposed to the wind from the vehicle front during vehicle travel. Specifically, the radiator 6 is positioned substantially right behind the bumper face opening 3a formed in the bumper face 3, whereby it can be cooled by the air taken in through the bumper face opening 3a during vehicle travel.

Furthermore, the vertical members 2b and 2b of the shroud panel 2 have their respective seal plates 9 and 9 formed below the portions thereof fixedly connected to the right and left front side frames 4 and 4 to prevent hot air from flowing back from the engine room.

Figure 8:
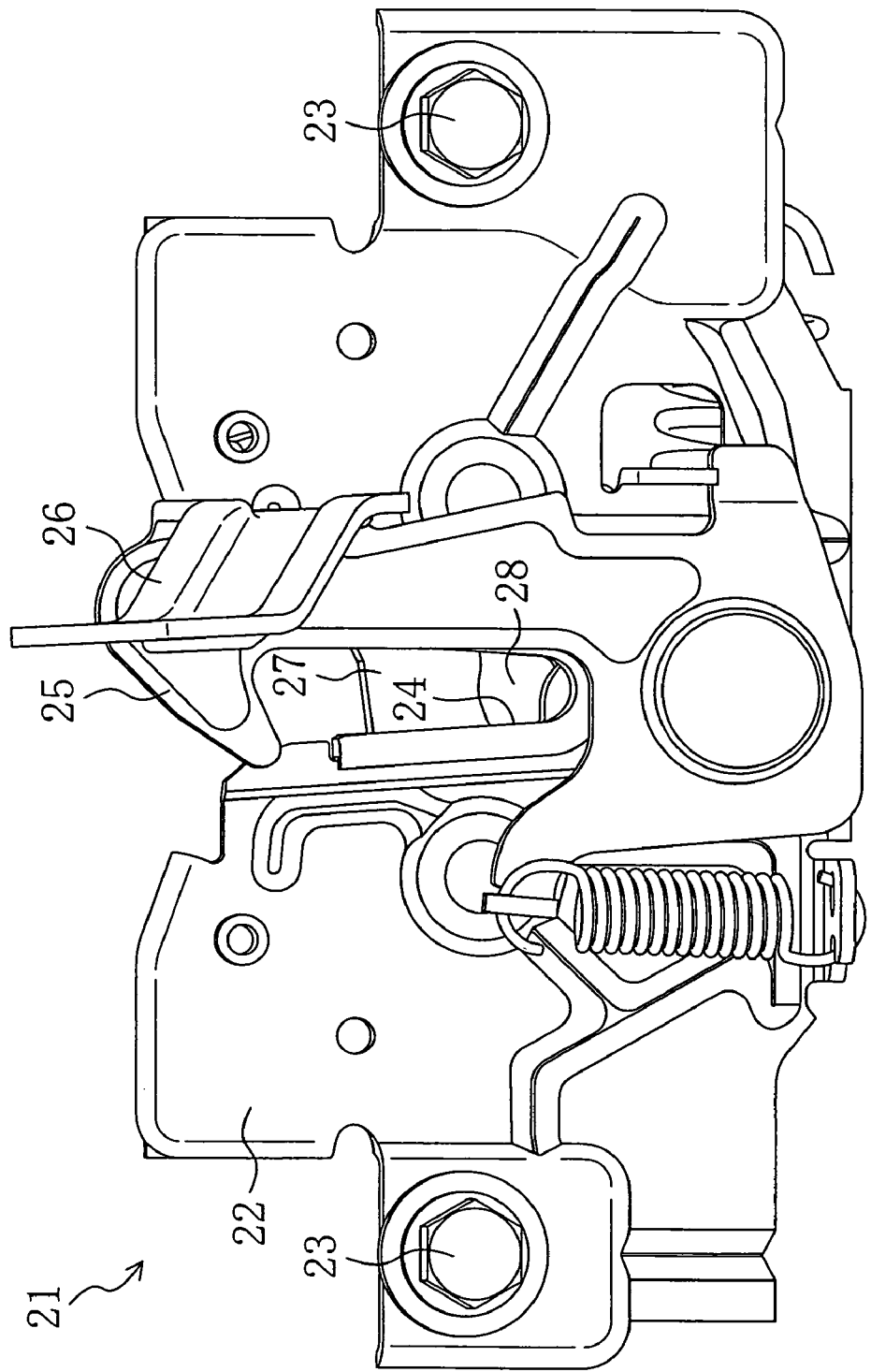
FIG. 8 is a front view of a bonnet lock.

As shown in FIG. 3, the shroud upper part 2a of the shroud panel 2 is formed, on the front side and in the widthwise middle, with a lock housing 2e for housing a bonnet lock 21. The lock housing 2e is formed in the shape of a pocket to open upward at the front surface of the shroud upper part 2a. A base plate 22 of the bonnet lock 21 as shown in FIG. 8 is fixedly fastened to a front part 2f constituting part of the lock housing 2e and mounting flanges 31c and 31c of the after-mentioned center stay 31 by bolts 23 and 23 (see FIG. 6) with the bonnet lock 21 inside the lock housing 2e (see FIG. 5). As shown in FIG. 3, the upper side of the front part 2f is formed, substantially in the widthwise middle, with a slit in which a striker 8a of substantially U-shape provided on the bonnet 8 (see FIG. 5) can be inserted so that the striker 8a can be engaged with the bonnet lock 21.

A brief description is given here of the structure of the bonnet lock 21 with reference to FIG. 8. The bonnet lock 21 has an engagement groove 24 formed substantially in the middle of the base plate 22 and latches and releases the striker 8a of the bonnet 8 in and from the engagement groove 24 by closing and opening the opening of the engagement groove 24 by a latch 27. Specifically, the latch 27 defines, in the engagement groove 24, a catching space 28 for catching the striker 8a therein. Furthermore, the bonnet lock 21 is provided with a latch 25 urged towards closing the opening of the engagement groove 24. The striker 8a of the bonnet lock 8 cannot completely be released unless a lever 26 integrally formed with the latch 25 is operated.

As shown in FIGS. 3 and 4, in the middle of the shroud upper part 2a of the shroud panel 2 in the vehicle widthwise direction, extensions 2h and 2h extending frontward are formed in correspondence with the mounting holes 12b and 12b in the mounting part 12 of the front grille 1. The extensions 2h and 2h are formed with mounting holes 2g and 2g individually vertically passing through the associated extensions 2h and 2h. The front grille 1 can be fixedly mounted to the shroud panel 2 by inserting bolts into the mounting holes 2g and 2g and the mounting holes 12b and 12b in the front grille 1 and fastening them by the bolts. Furthermore, the front surface of the shroud upper part 2a is formed at both the widthwise ends with round holes 2i and 2i opening towards the vehicle front. The round holes 2i and 2i receive associated projections 12c and 12c projecting from the mounting part 12 of the front grille 1 towards the vehicle rear.

The center stay 31 is disposed to connect the lock housing 2e of the shroud panel 2 to the widthwise middle of the bumper beam 5. Specifically, the center stay 31 is connected at one end to the base plate 22 of the bonnet lock 21 in the lock housing 2e and connected at the other end to the rear side of the bumper beam 5, thereby absorbing impact load caused when the striker 8a of the bonnet 8 engages with the bonnet lock 21 from above. Thus, the provision of the center stay 31 prevents the resin shroud panel 2 from being damaged by impact when the bonnet 8 is closed.

Figure 9:
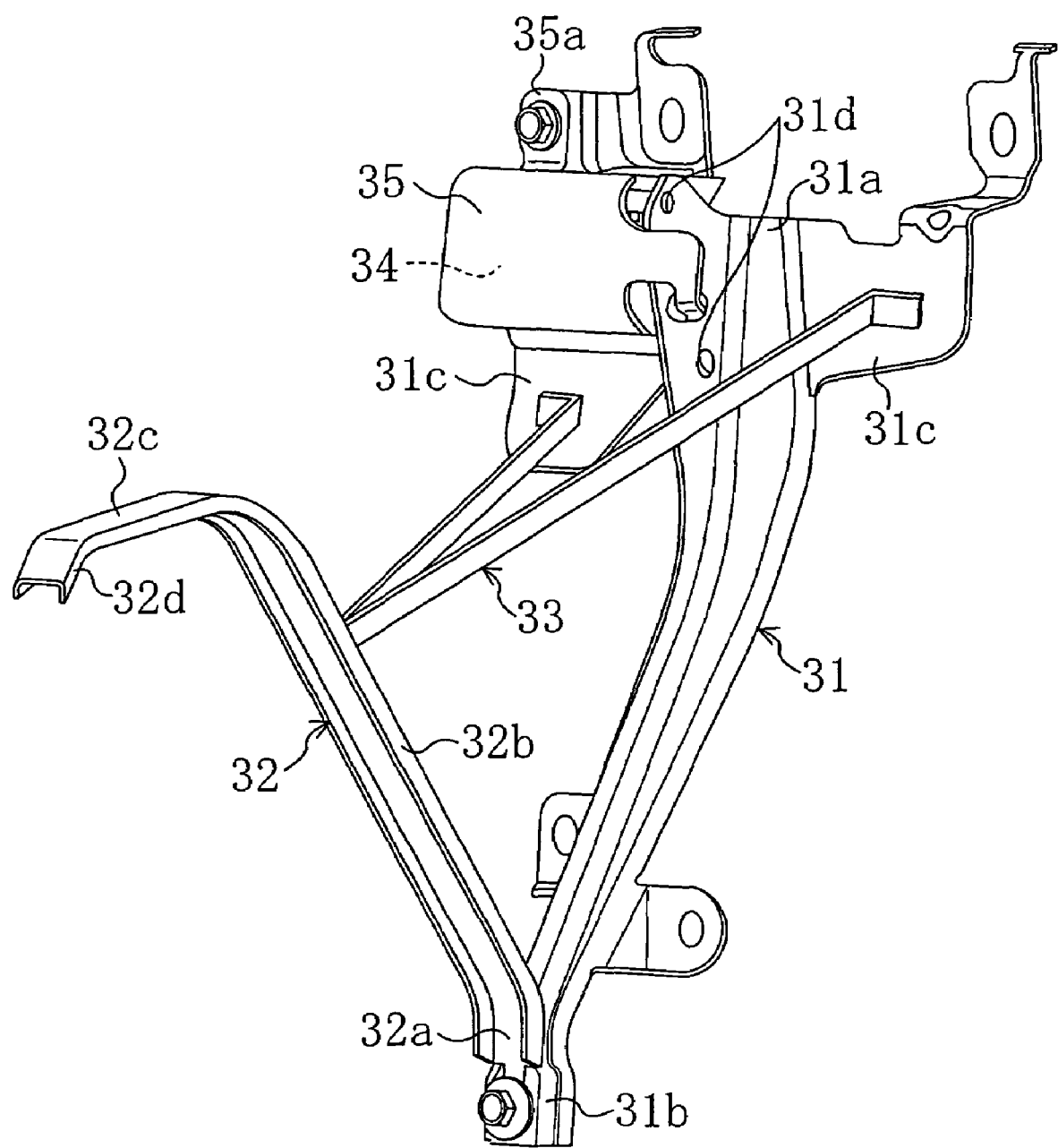
FIG. 9 is a perspective view of a center stay assembly according to Embodiment 1.

As shown in FIG. 9, the center stay 31 is constituted by a metal structural member of substantially lateral U-shaped cross section and its lower end serving as a bumper beam side mounting part 31b is located frontwardly of its upper end serving as a shroud panel side mounting part 31a. In other words, the center stay 31 has such a shape that both the mounting parts 31a and 31b extending substantially upright as viewed from a lateral side are connected by a connecting part extending rearward with approach towards the top end.

The center stay 31 is fastened at the bumper beam side mounting part 31b to the bumper beam 5 by a bolt. The shroud panel side mounting part 31a has the right and left mounting flanges 31c and 31c (flanges) extending from the body of lateral U-shaped cross section (body of the center stay) to the right and left, respectively. The center stay 31 is also fastened at the mounting flanges 31c and 31c to the shroud panel 2 by bolts. As described later, the shroud panel side mounting part 31a is fastened together with the base plate 22 of the bonnet lock 21. Thus, the center stay 31 is directly connected to the bonnet lock 21.

The bumper beam side mounting part 31b of the center stay 31 is joined by spot welding to the lower end of a grille support member 32 (a grille support) whose upper end extends to the bottom of the front grille 1. As shown in FIGS. 3 and 9, the grille support member 32 is a metal structural member formed substantially in the shape of the letter C in side view and is configured so that its upper end is located frontwardly of its lower end.

Specifically, the grille support member 32 is formed by bending a long member of substantially lateral U-shaped cross section at three points of its length and composed of, in order from bottom to top, a joining part 32a (a root end) joined to the bumper beam side mounting part 31b of the center stay 31, an arm 32b extending frontward and upward, an abutment 32c (an abutment supporting part) abutting on the bottom of the front grille 1 and a guide 32d for easy rest of the front grille 1 on the abutment 32c.

The joining part 32a is formed to extend substantially upright in side view along the bumper beam side mounting part 31b of the center stay 31 and is joined by spot welding to the bumper beam side mounting part 31b in superposed relation with each other. The arm 32b is formed to extend frontward and upward from the upper end of the joining part 32a and is joined by welding or in any other appropriate manners to the root end of an auxiliary support member 33 (an auxiliary support) formed substantially in the shape of the letter V in top view. The auxiliary support member 33 is also joined, at the right and left distal ends defining the opening of the letter V, to the right and left mounting flanges 31c and 31c formed on the shroud panel side mounting part 31a. Thus, the grille support member 32 and the center stay 31 are connected not only at the lower ends of both of them but also at upper portions of both of them, which enhances the rigidity of the grille support member 32 in the front-to-rear direction of the vehicle. In addition, since the auxiliary support member 33 is of substantially V-shape in top view and its right and left distal ends defining the opening of the letter V are joined to the right and left mounting flanges 31c and 31c, respectively, of the center stay 31, the rigidity of the grille support member 32 in the vehicle widthwise direction can be also enhanced. Furthermore, the center stay 31, the grille support member 32 and the auxiliary support member 33 are thus joined together, thereby constituting a center stay assembly.

The abutment 32c is formed to extend substantially horizontally in the front-to-rear direction of the vehicle as viewed from a lateral side and thereby configured to support the front grille 1 from below. The guide 32d is formed to extend frontward and downward from the front end of the abutment 32c and thereby configured to smoothly lift up the front grille 1 to the top of the abutment 32c.

Even if, like this embodiment, the front grille 1 is of large size, is largely inclined so that its lower side is located frontwardly of its upper side and formed in an arcuate shape in top view, the provision of the grille support member 32 surely prevents the widthwise middle part of the front grille 1 from largely deforming downward owing to its own weight. Specifically, in the known art, the front grille 1 is supported at its upper side to the shroud panel 2 and the head lamps 7 and 7 and supported at its lower side to the bumper face 3. In this case, if its widthwise middle part having the heaviest weight is inclined, the weight of the front grille 1 cannot be borne by mainly supporting its upper side and a heavy load is placed on the bumper face 3 of relative low rigidity to largely deform the bumper face 3. Since, in this embodiment, the widthwise middle part of the front grille 1 is supported from below by the grille support member 32 made of metal, the above deformation of the bumper face 3 can be prevented.

Thus, the bumper face 3 can be prevented from deforming owing to the weight of the front grille 1 and thereby creating a gap between the front grille 1 and the bonnet 8. In other words, the vehicle front end can be prevented from being disfigured.

Furthermore, as shown in FIG. 9, the center stay 31, the grille support member 32 and the auxiliary support member 33 are joined together. Therefore, although the grille support member 32 is provided, there is no need to do an additional work to mount the grille support member 32 to the vehicle body and the grille support member 32 can be mounted together with the center stay 31. This does not deteriorate the assemblability of the vehicle front end.

Figure 6:
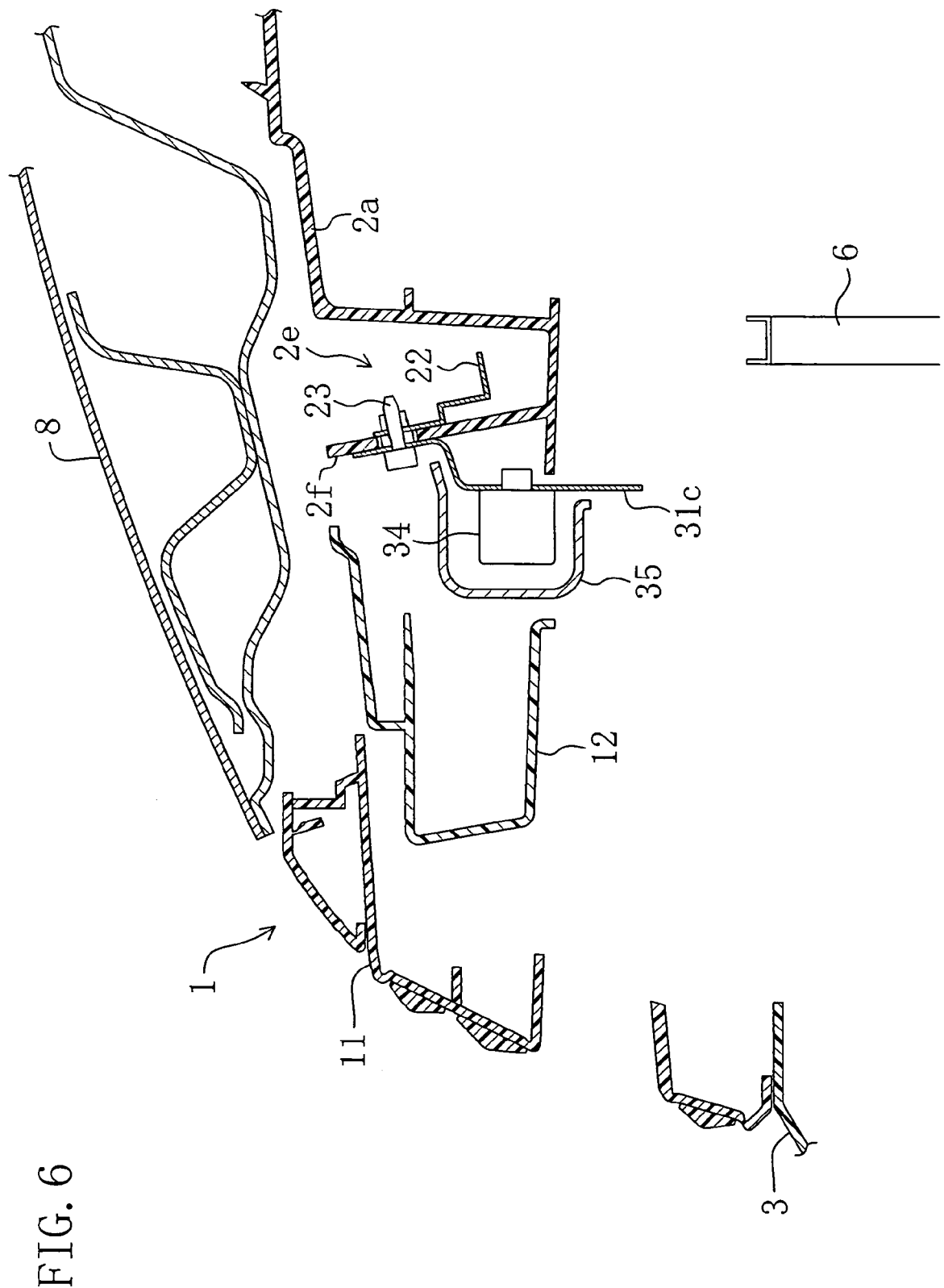
FIG. 6 is an enlarged view of an upper part of a cross section taken along the line VI-VI in FIG. 1.

In addition, as shown in FIGS. 3, 6 and 9, the shroud panel side mounting part 31a of the center stay 31 is provided with an impact sensor 34 for detecting impact. Specifically, a cover 35 of substantially lateral U-shaped cross section is disposed to partly cover the front side of one of the right and left mounting flanges 31c and 31c of the shroud panel side mounting part 31a (the left mounting flange in front view in this embodiment). The impact sensor 34 is placed inside the cover 35. The impact sensor 34 is partly connected to the mounting flange 31c and configured to detect impact transmitted to the center stay 31.

With the above structure, since the center stay 31 is provided with the grille support member 32 as described above, impact loads through two paths are placed on the center stay 31. Specifically, since the bumper beam side mounting part 31b at the lower end of the center stay 31 is connected to the bumper beam 5 and also connected integrally with the lower end of the grille support member 32, an impact load coming from the upper end of the grille support member 32 is also transmitted to the center stay 31. Thus, not only an impact load from the bumper beam 5 but also an impact load from the front grille 1 can be detected, which enables the detection of a collision with higher accuracy.

The cover 35 is disposed to open in a direction along the vehicle width and has a flange 35a extending upward from its upper side wall and the flange 35a is fixedly attached to the mounting flange 31c of the center stay 31.

Assembly of Bonnet Lock and Center Stay to Shroud Panel

Next, a description will be given below of the assembly of the bonnet lock 21 and the center stay 31 to the shroud panel 2 in the vehicle front end structure having the above configuration. The bonnet lock 21 is required to be positioned with high accuracy in order to engage it with the striker 8a of the bonnet 8. Furthermore, in order to fasten the center stay 31 together with the bonnet lock 21 as described above, the center stay 31 is also required to be concurrently positioned with high accuracy. Therefore, the description will be given here focusing on the positioning.

Figure 10:
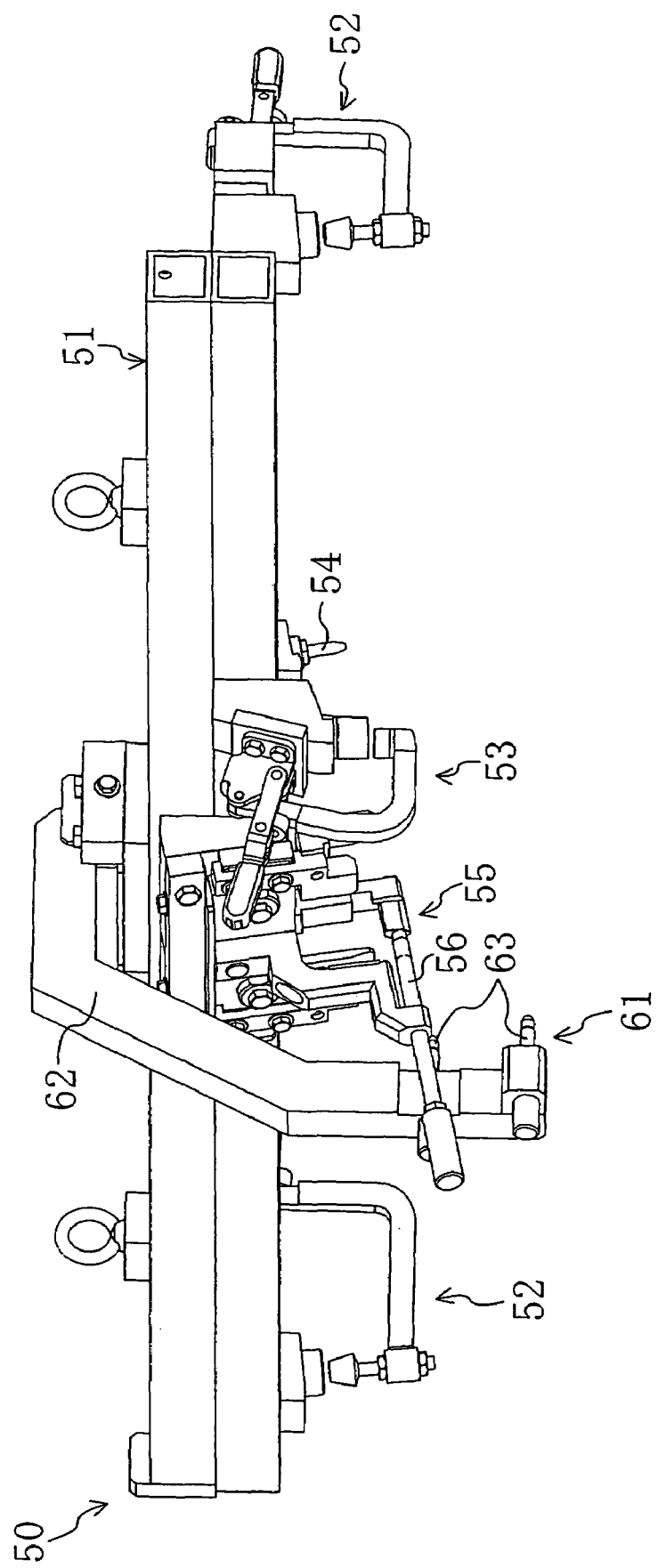
FIG. 10 is a front perspective view showing a schematic structure of a positioning jig.
Figure 11:
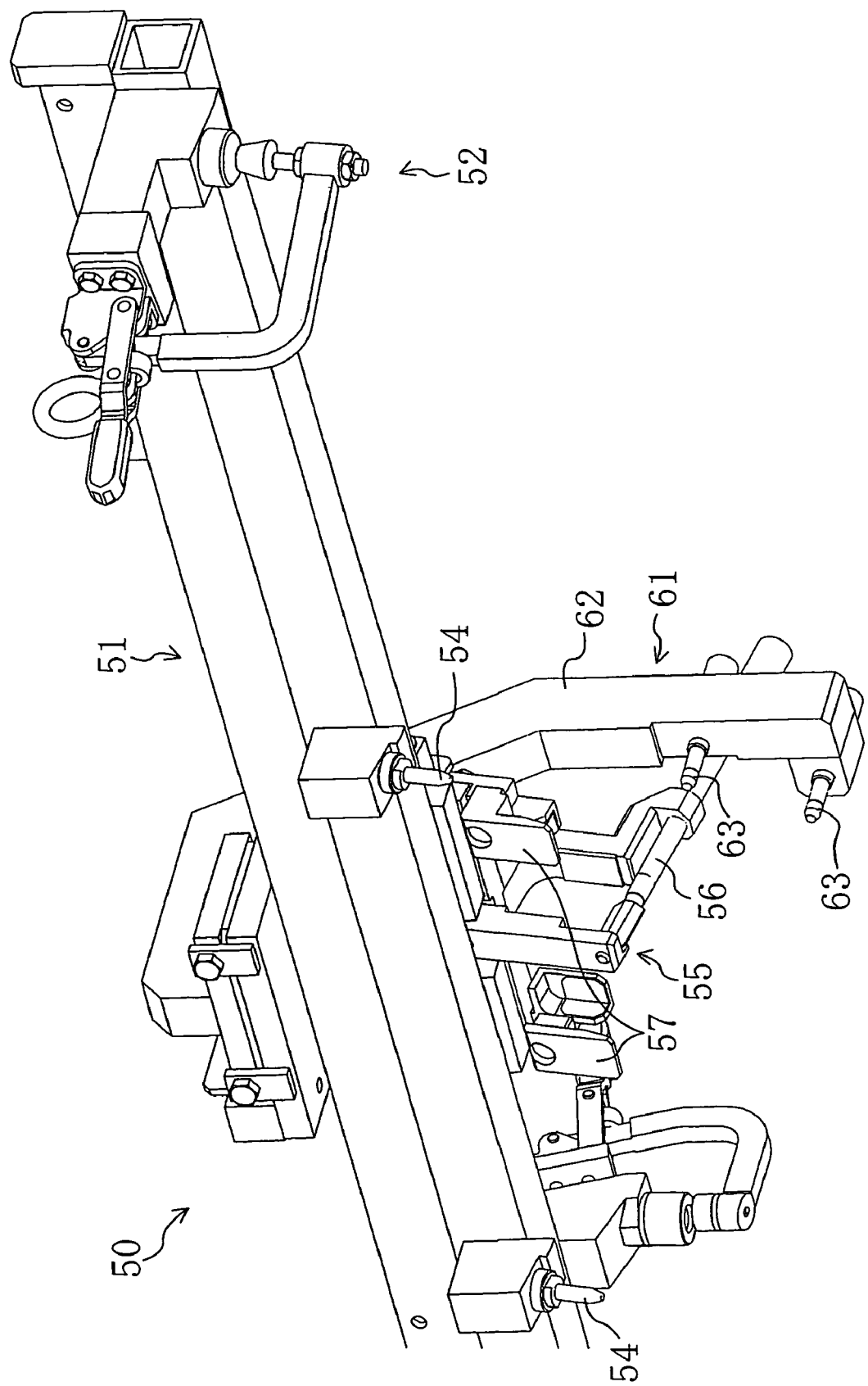
FIG. 11 is a rear perspective view showing the schematic structure of the positioning jig.

First, a jig 50 for use in the positioning of the bonnet lock 21 and the center stay 31 is described with reference to FIGS. 10 and 11. The positioning jig 50 includes: a body 51 in which two square pipes extending along the vehicle width are vertically juxtaposed and joined together; a bonnet lock positioning part 55 disposed to the front side of the body 51 in the vicinity of the widthwise middle thereof; and a center stay positioning part 61 having an arm 62 formed to extend frontward from the top of the body 51 in the vicinity of the widthwise middle thereof. The positioning jig 50 is configured to concurrently position and mount the bonnet lock 21 and the center stay 31 to the shroud panel 2 with high accuracy.

The body 51 is provided, at both widthwise ends and near the bonnet lock positioning part 55, with clamps 52, 52 and 53 for vertically clamping the shroud upper part 2a of the shroud panel 2. The clamps 52, 52 and 53 are so-called vice type ones and, specifically, they are each configured to clamp the shroud upper part 2a of the shroud panel 2 by turning their L-shaped arm by a lever operation to lift up a pin provided at the distal end of the arm.

The body 51 is also provided to the right and left of the bonnet lock positioning part 55 with positioning pins 54 and 54 projecting downward. These positioning pins 54 and 54 are configured to be inserted into the associated positioning holes 2j and 2j formed in the top surface of the shroud upper part 2a of the shroud panel 2 with the positioning jig 50 fitted onto the shroud panel 2.

The bonnet lock positioning part 55 includes: a bar 56 extending in the vehicle front-to-rear direction so that its distal end can be inserted into the catching space 28 in the engagement groove 24 of the bonnet lock 21; and a base plate clamp 57 for clamping the base plate 22 of the bonnet lock 21 in the vehicle front-to-rear direction. The bonnet lock 21 can be positioned vertically by the bar 56 and horizontally (in the front-to-rear and right-to-left directions) by the base plate clamp 57.

Figure 12:
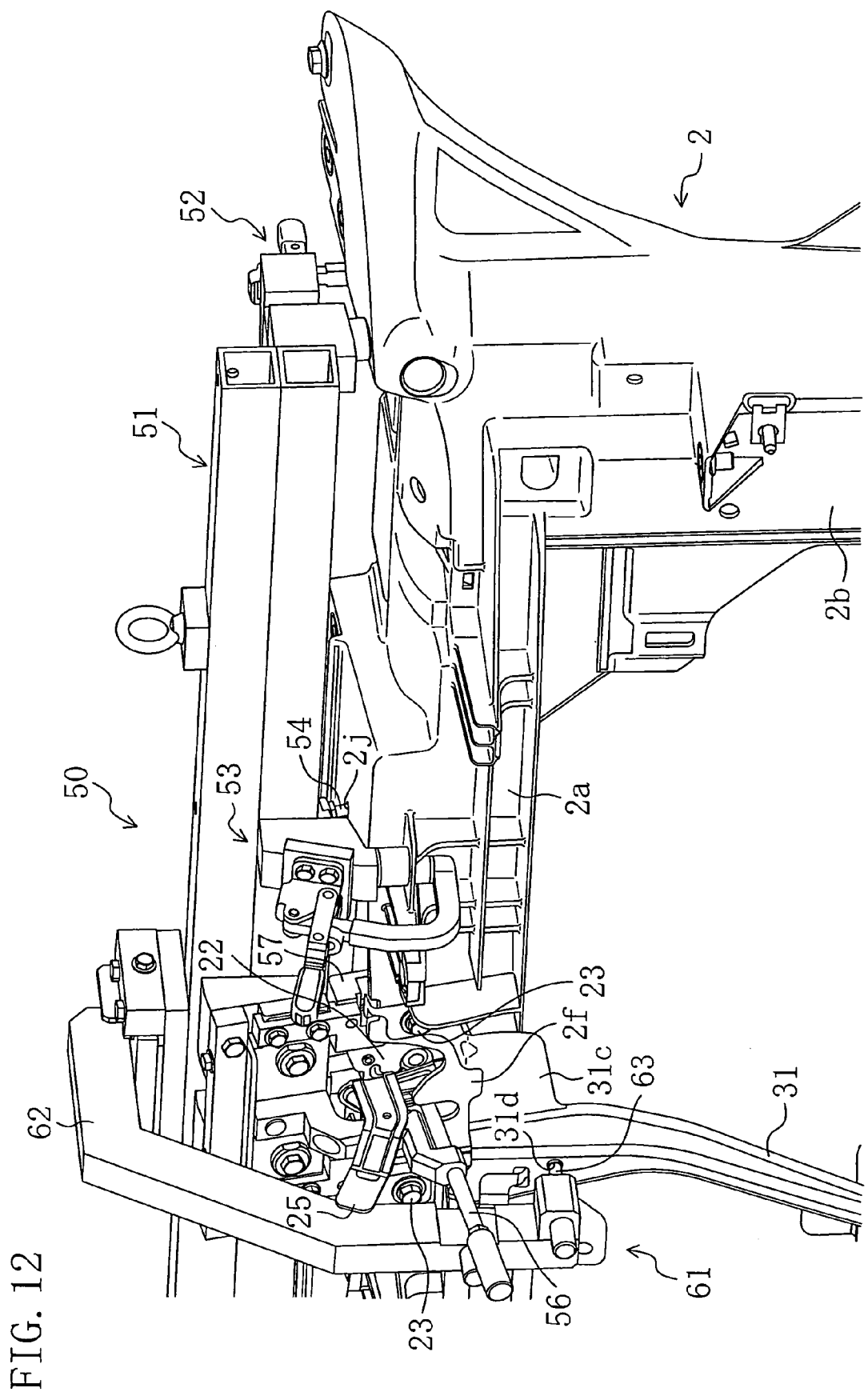
FIG. 12 is a perspective view showing how the bonnet lock and the center stay are assembled on a shroud panel using the positioning jig.

The center stay positioning part 61 includes; the arm 62 extending frontward from the top surface of the body 51; and positioning pins 63 and 63 formed at specified positions of the front end of the arm 62 to project rearward. The center stay 31 can be positioned to the shroud panel 2 by inserting the positioning pins 63 and 63 into the associated positioning holes 31d and 31d formed in the shroud panel side mounting part 31a of the center stay 31 (see FIG. 12).

A description is given below of the positioning and mounting of the bonnet lock 21 and the center stay 31 to the shroud panel 2 with the use of the positioning jig 50 having the above structure.

First, the bonnet lock 21 is mounted to the bonnet lock positioning part 55 of the positioning jig 50. Specifically, the distal side of the bar 56 of the bonnet lock positioning part 55 is inserted into the catching space 28 of the bonnet lock 21 for catching the striker 8a of the bonnet 8 and the base plate 22 of the bonnet lock 21 is clamped by the base plate clamp 57. Thus, the vertical position of the bonnet lock 21 relative to the positioning jig 50 can be fixed by inserting the bar 56 into the bonnet lock 21, while the horizontal position thereof relative to the positioning jig 50 can be fixed by clamping the base plate 22 with the base plate clamp 57.

Furthermore, the center stay 31 is mounted to the center stay positioning part 61 of the positioning jig 50. Specifically, the positioning pins 63 and 63 of the center stay positioning part 61 are inserted into the associated positioning holes 31d and 31d in the center stay 31.

Then, as described above, with the bonnet lock 21 fixed relatively to the positioning jig 50 and the center stay 31 mounted thereto, the positioning jig 50 is fixed relatively onto the shroud panel 2. Specifically, the positioning pins 54 and 54 on the body 51 of the positioning jig 50 are inserted into the positioning holes 2j and 2j in the shroud upper part 2a of the shroud panel 2, thereby vertically positioning the jig 50. In this state, the shroud upper part 2a is clamped in the thickness direction by the clamps 52, 52 and 53 of the body 51, thereby fixing the positioning jig 50 relatively to the shroud panel 2.

Thus, the bonnet lock 21 fixed relatively to the positioning jig 50 is positioned at a specified position relative to the shroud panel 2, i.e., at the design position in the lock housing 2e formed in the shroud upper part 2a of the shroud panel 2 and corresponding to the striker 8a of the bonnet 8. Concurrently, the center stay 31 mounted to the center stay positioning part 61 is positioned at the position where its mounting flanges 31c and 31c can be fastened together with the base plate 22 of the bonnet lock 21.

When, in the above state, the bolts 23 and 23 are inserted into the associated mounting holes in the base plate 22 of the bonnet lock 21, the associated mounting holes in the lock housing 2e and the associated mounting holes in the mounting flanges 31c and 31c of the center stay 31 and tightened, the bonnet lock 21 and the center stay 31 are fastened together and mounted at the position as designed.

The positioning of the bonnet lock 21 in the above manner prevents the occurrence of imperfect engagement and abnormal noise when the striker 8a of the bonnet 8 engages with the bonnet lock 21. Furthermore, since the center stay 31 is positioned concurrently, the grille support member 32 integral with the center stay 31 can be positioned to the bottom of the front grille 1 with high accuracy, which provides secure support of the front grille 1. In addition, since the center stay 31 is also positioned to the shroud panel 2 by the jig 50 for positioning the bonnet lock 21, there is no need for any jig special for the center stay 31, thereby reducing the production cost.

As described above, the center stay 31 disposed between the shroud panel 2 and the bumper beam 5 is integrally provided with the grille support member 32 for supporting the widthwise middle of the front grille 1 from below. Therefore, even if the front grille is of relatively large size, is inclined so that its lower side is located frontwardly of its upper side and is formed substantially in an arcuate shape in top view so that its widthwise middle part protrudes frontward, the widthwise middle part can be prevented from deforming downward owing to its own weight. Hence, it can be prevented that the bumper face 3 supporting the front grille 1 from below largely deforms to create an unsightly gap between the front grille 1 and the bonnet 8 and thereby disfigure the vehicle front end.

Furthermore, since the grille support member 32 extends upward from the bumper beam side mounting part 31b at the lower end of the center stay 31, the grille support member 32 undergoes the load of the front grille 1 in its compressive direction in which it has a relatively high rigidity. In addition, since the grille support member 32 extends from the bumper beam side mounting part 31b closest to the front grille 1, it can be short, which enhances the rigidity of the grille support member 32. From these causes, the front grille 1 can be supported with higher stability and higher reliability.

Furthermore, the grille support member 32 and the center stay 31 are connected also by the auxiliary support member 33 formed substantially in the shape of the letter V in top view, whereby the grille support member 32 is restricted from falling out of position. Specifically, since the root end of the auxiliary support members 33 is connected to the grille support member 32 and the distal ends thereof are connected to the mounting flanges 31c and 31c extending to the right and left from the body of the center stay 31, this enhances the rigidity of the grille support member 32 in the vehicle front-to-rear direction and widthwise direction. Thus, the front grille 1 can be supported with higher reliability.

In addition, since, as described above, the grille support member 32 is provided integrally with the center stay 31, it can be mounted to the vehicle body together with the center stay 31. This does not deteriorate the assemblability of the vehicle front end.

Embodiment 2

Figure 13:
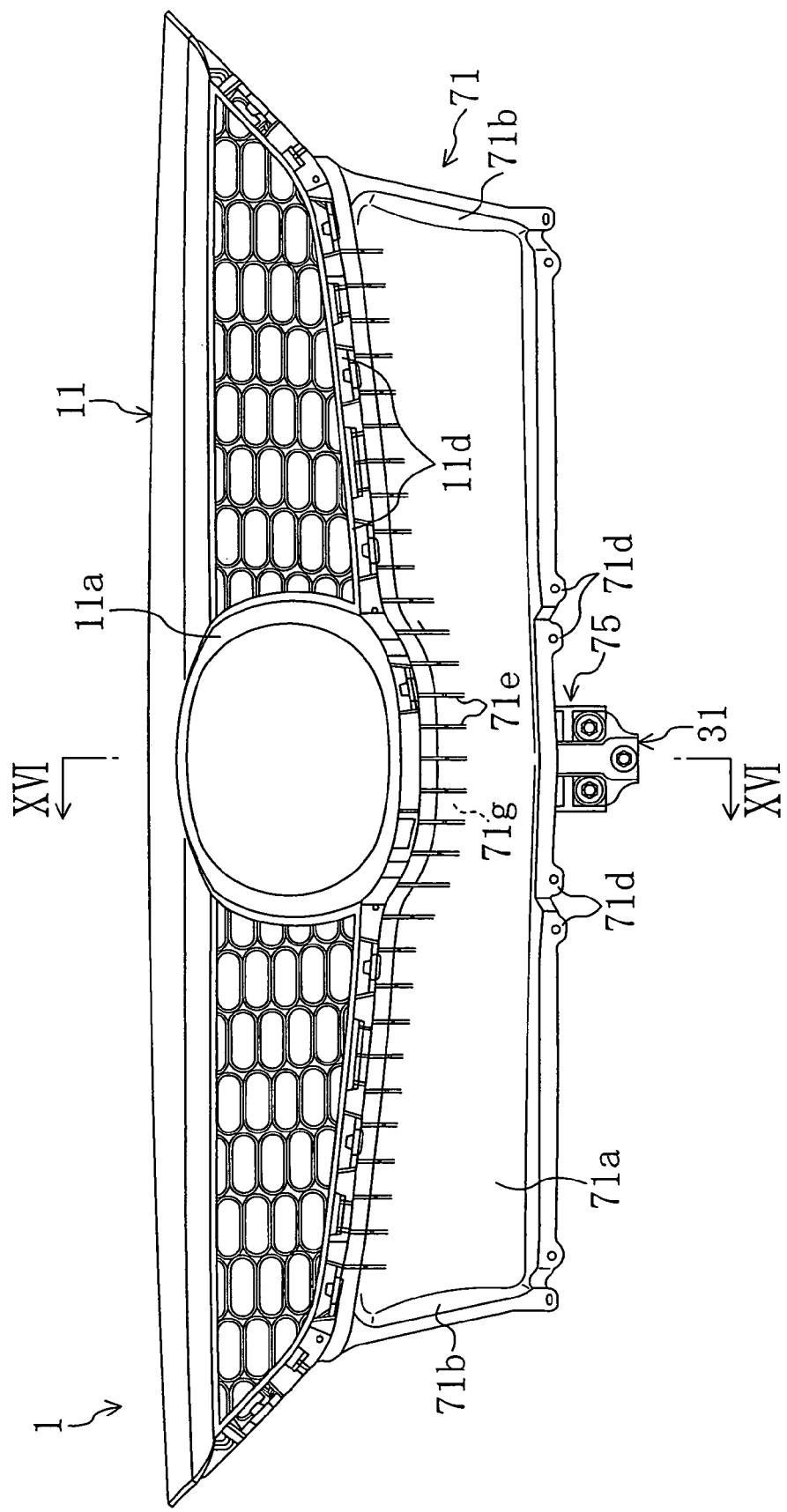
FIG. 13 is a front view schematically showing a front grille support structure according to Embodiment 2 of the present invention.
Figure 14:
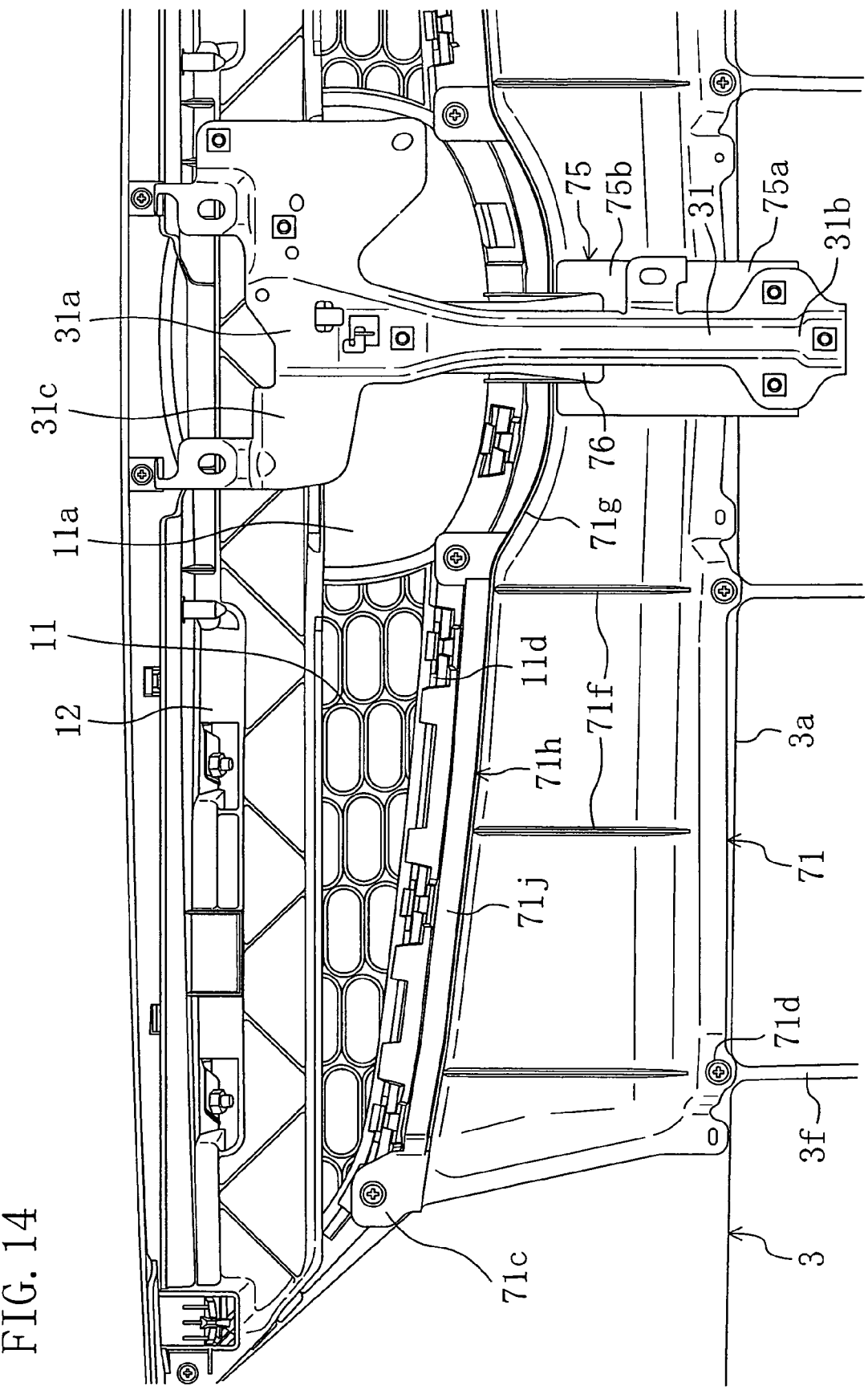
FIG. 14 is a rear view schematically showing the front grille support structure.
Figure 15:
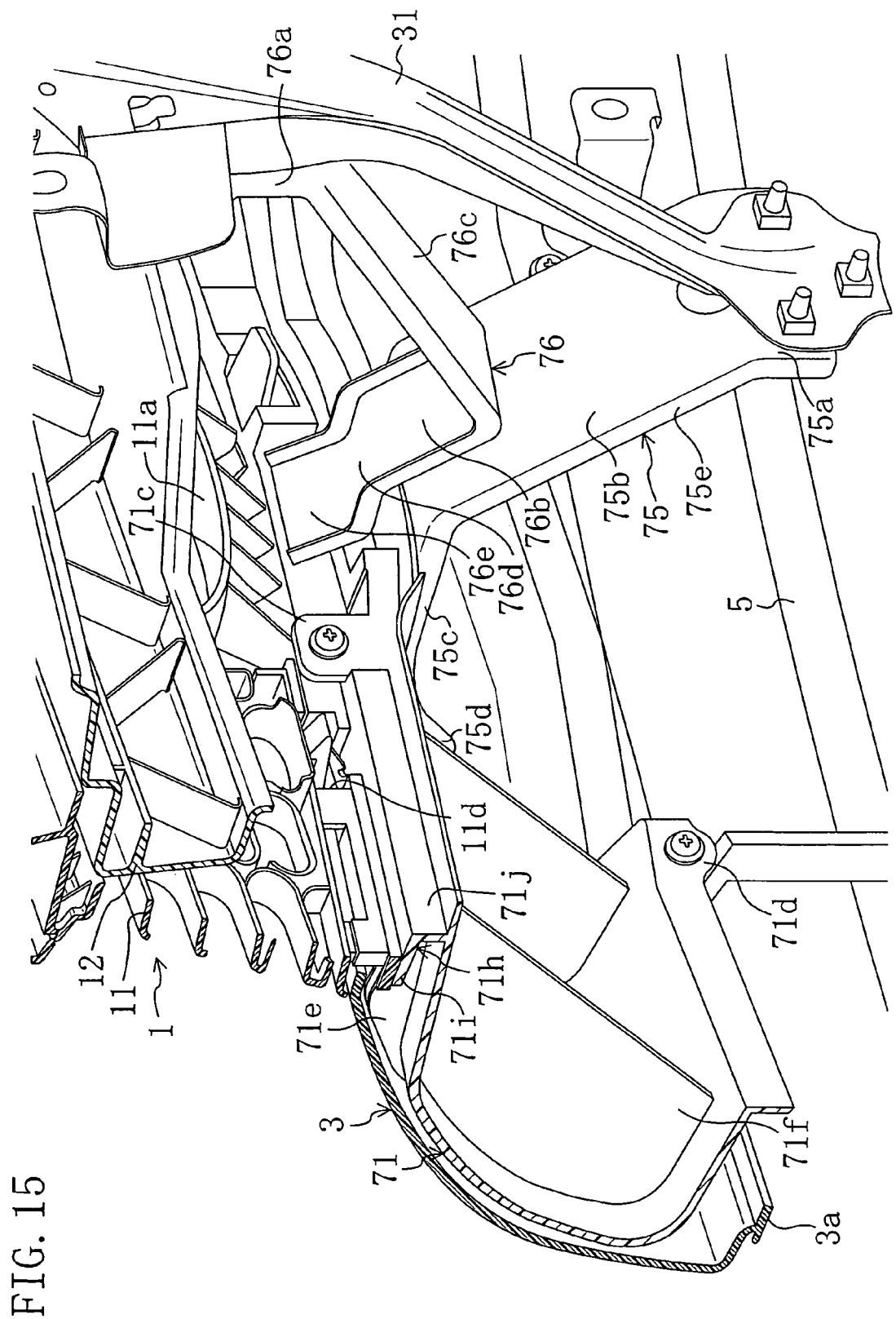
FIG. 15 is an enlarged rear perspective view showing a bumper retainer support structure.
Figure 16:
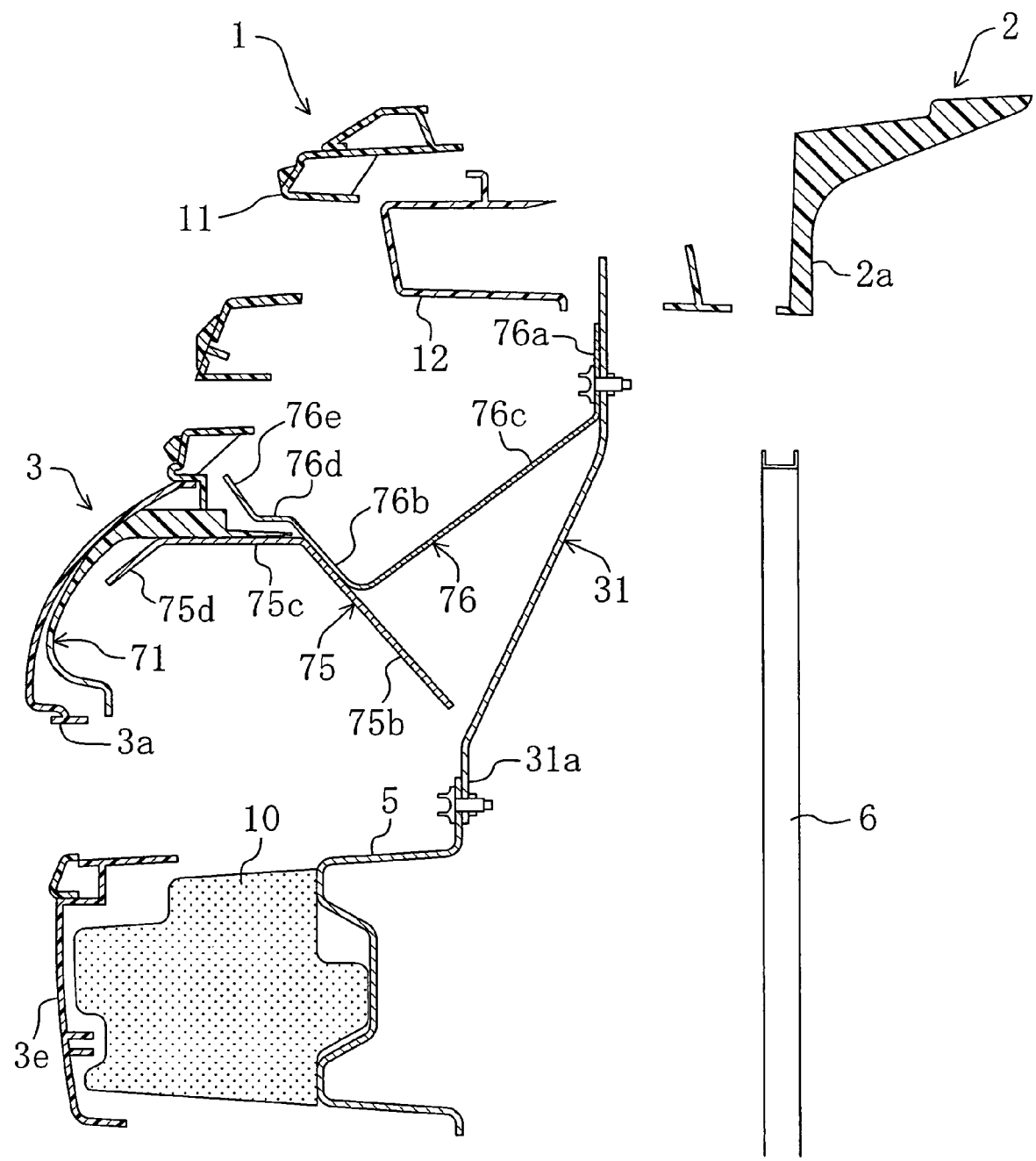
FIG. 16 is a cross-sectional view of a vehicle front end corresponding to the cross section taken along the line XVI-XVI in FIG. 13.

FIGS. 13 to 15 show a front view, a back view and a rear perspective view of a vehicle front end structure according to Embodiment 2 of the present invention. The vehicle front end structure according to Embodiment 2 is different from that of Embodiment 1 only in the support structure for the front grille 1. Therefore, the same parts are identified by the same reference numerals and a description is given only of the different points.

In this embodiment, the front face (a surface) of a bumper retainer 71 abuts on the back of the bumper face 3 to enhance the rigidity of the bumper face 3 and the bumper retainer 71 supports the front grille 1 from below. Furthermore, the bumper retainer 71 is supported by a retainer support member 75 (grille support) extending frontward and upward from the bumper beam side mounting part 31b of the center stay 31.

Figure 17:
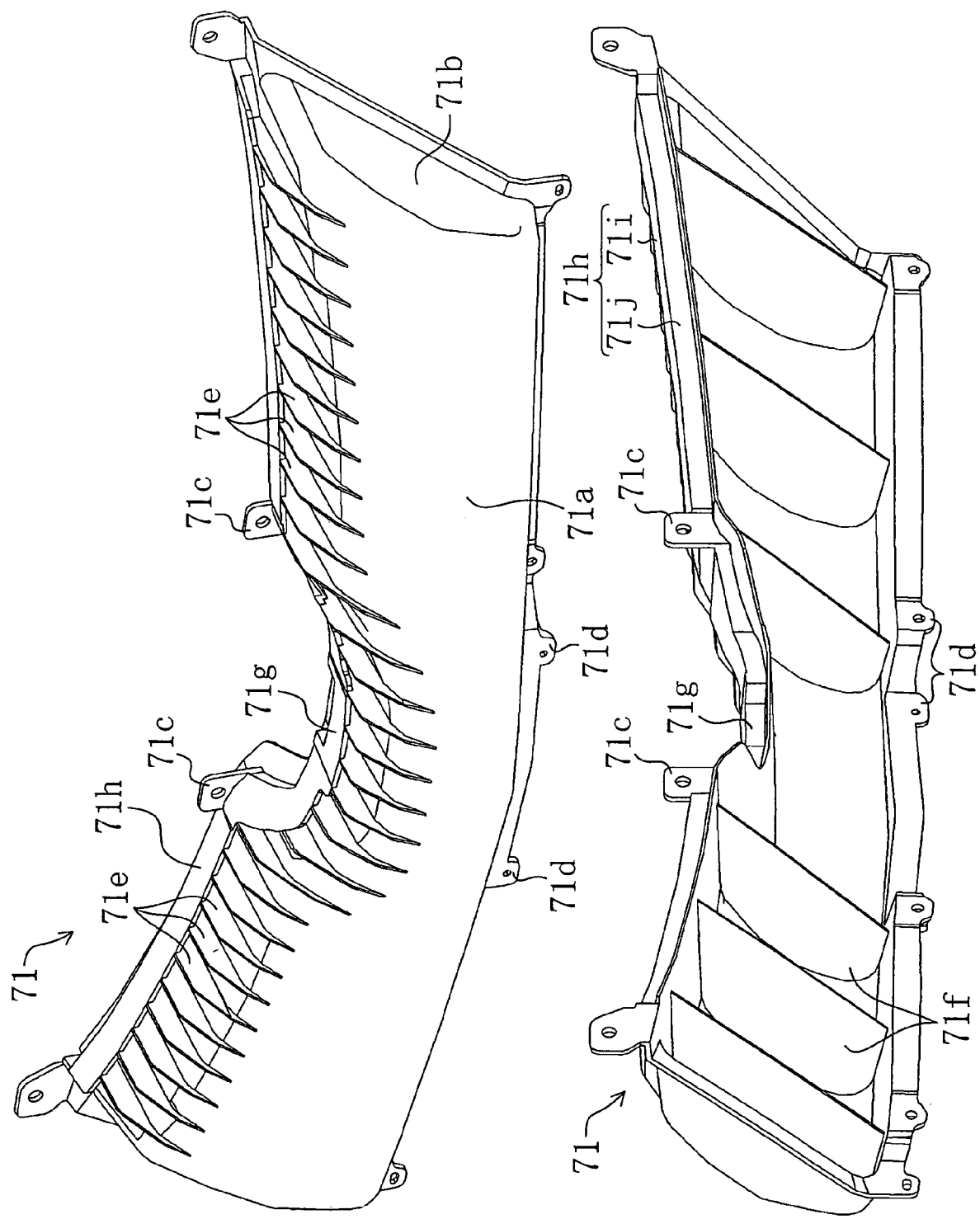
FIG. 17A is a front perspective view of a bumper retainer and FIG. 17B is a rear perspective view of the bumper retainer.

Specifically, as also shown in FIG. 17, the bumper retainer 71 is a resin structural member formed to conform to the bottom of the front grille 1 in order to support the entire front grille 1 from below and is formed substantially into a C-shaped cross section to protrude frontward to conform to the bumper face 3 disposed under the front grille 1. More specifically, the bumper retainer 71 includes: a bumper face support 71a formed substantially into a C-shaped cross section to conform to the back of the bumper face 3 formed so that its vertical middle part protrudes frontward; and side walls 71b and 71b provided on both ends of the bumper face support 71a. Thus, the bumper retainer 71 enhances its rigidity as a whole.

The back of the bumper face support 71a has a plurality of inside ribs 71f, 71f, . . . arranged widthwise substantially in parallel with each other to extend in the vehicle front-to-rear direction, thereby further enhancing the rigidity of the bumper retainer 71.

The bumper face support 71a of the bumper retainer 71 is provided at the upper side rear end with a plurality of grille connecting parts 71c, 71c, . . . for connecting the bumper retaining 71 to the lower end of the front grille 1, and provided at the lower side rear end with a plurality of bumper face connecting parts 71d, 71d, . . . for connecting the bumper retainer 71 to the bumper face 3. Thus, the bumper retainer 71 is fixedly connected at the upper side to the front grille 1 and at the lower side to the bumper face 3 while being positioned behind the bumper face 3.

Furthermore, an upper portion of the front face of the bumper face support 71a has a plurality of outside ribs 71e, 71e, . . . (vertical ribs) each extending in the vehicle front-to-rear direction and arranged in the vehicle widthwise direction substantially in parallel with each other. The outside ribs 71e, 71e, . . . extend for such a length that their edges come into contact with the back of the bumper face 3. Therefore, these outside ribs 71e, 71e, support the bumper face 3 in abutting engagement therewith.

The outside ribs 71e, 71e, . . . are provided at the rear and top ends with a plate-shaped shelf 71h extending in the vehicle widthwise direction. Specifically, the shelf 71h includes: an upper plate 71i provided on rear parts of the top ends of the outside ribs 71e, 71e, . . . to form spaces with the bumper face support 71a; and a vertical wall 71j provided on the rear end of the upper plate 71i, i.e., on the rear ends of the outside ribs 71e, 71e, . . . to extend downward from the upper plate 71i. In other words, the shelf 71h is provided to cover the outside ribs 71e, 71e, . . . from the rear. When the bumper retainer 71 is placed under the front grille 1, the shelf 71h abuts on the bottom of the front grille 1. Thus, the front grille 1 can be supported over its entire bottom, thereby enhancing the supporting stability. Furthermore, the provision of the shelf 71h results in that the rear ends of the plurality of outside ribs 71e, 71e, . . . are connected together by the shelf 71h, which enhances the rigidity of the outside ribs 71e, 71e, . . . . and in turn enhances the rigidity of the entire bumper retainer 71. Therefore, the bumper face 3 can be supported from behind with higher reliability, thereby enhancing the rigidity of the bumper face 3.

A widthwise middle part of the top end of the bumper face support 71a is recessed so that the emblem part 11a of the front grille 1 is positioned therein. The recessed part of the bumper face support 71a provides a supported part 71g (an upper part) that is to be supported from below by the after-mentioned retainer support member 75.

Figure 18:
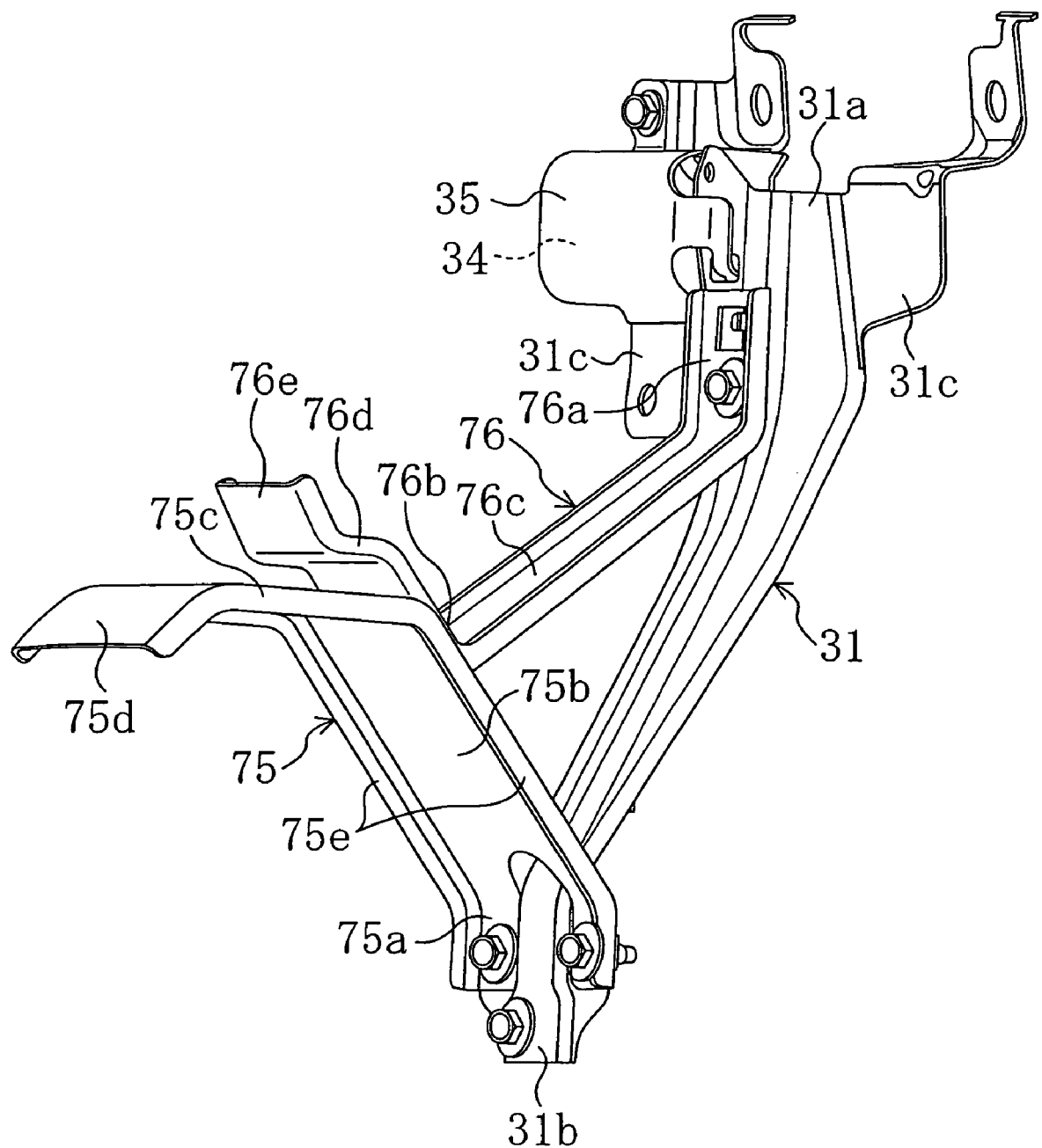
FIG. 18 is a perspective view of a center stay assembly according to Embodiment 2.

As shown in FIGS. 15 and 18, the retainer support member 75 is made of a relatively wide plate material, its lower end is fastened to the bumper beam side mounting part 31b of the center stay 31 by a bolt, and its upper end extends frontward and upward and is positioned under the supported part 71g of the bumper retainer 71. Specifically, like the grille support member 32 in Embodiment 1, the retainer support member 75 is formed by bending a plate material of substantially lateral U-shaped cross section at three points of its length and composed of, in order from bottom to top, a joining part 75a (a root end) joined to the bumper beam side mounting part 31b of the center stay 31, an arm 75b extending frontward and upward from the front end of the joining part 75a, an abutment 75c (an abutment supporting part) abutting on the bottom of the supported part 71g of the bumper retainer 71 and a guide 75d for easy rest of the bumper retainer 71 on the abutment 75c.

The joining part 75a is formed to extend substantially upright in side view along the bumper beam side mounting part 31b of the center stay 31, has a slit formed in the widthwise middle to extend upward from the lower end and is fixedly fastened at both sides of the slit to the center stay 31 by bolts.

The arm 75b is formed to extend frontward and upward from the upper end of the joining part 75a and is fixed by spot welding or in any other appropriate manners to one end of the after-mentioned auxiliary support member 76 (an auxiliary support). The auxiliary support member 76 is joined at the other end to the bumper beam side mounting part 31b of the center stay 31. Thus, the retainer support member 75 and the center stay 31 are connected not only at the lower ends of both of them but also at upper portions of both of them, which enhances the rigidity of the retainer support member 75 in the front-to-rear direction of the vehicle. Furthermore, the center stay 31, the retainer support member 75 and the auxiliary support member 76 are thus joined together, thereby constituting a center stay assembly.

The abutment 75c is formed to extend substantially horizontally in the front-to-rear direction of the vehicle as viewed from a lateral side and thereby configured to support the supported part 71g of the bumper retainer 71 from below. The guide 75d is formed to extend frontward and downward from the front end of the abutment 75c and thereby configured to smoothly lift up the bumper retainer 71 to the top of the abutment 75c.

The retainer support member 75 is formed substantially into a U-shaped cross section by bending the right and left ends downward or frontward over the joining part 75a, the arm 75b, the abutment 75c and the guide 75d. The bending of the right and left ends enhances the rigidity of the retainer support member 75, thereby providing more secure support of the bumper retainer 71 form below.

As shown in FIGS. 15 and 18, particularly, the joining part 75a of the retainer support member 75 has right and left flanges 75e and 75e bent frontward. Therefore, if an impact is applied to the retainer support member 75 from in front thereof, the flanges 75e and 75e of the joining part 75a of the retainer support member 75 open to the right and left to facilitate the rearward deformation of the retainer support member 75. Therefore, the frontward extension of the flanges 75e and 75e at the joining part 75a of the retainer support member 75 enhances the rigidity of the retainer support member 75 against a load from above, while it does not act to reinforce the retainer support member 75 against a load from front and enables the retainer support member 75 to relatively easily deform rearward.

Hence, if impact load placed through the front grille 1 and the retainer support member 75 on the impact sensor 34, which is provided like Embodiment 1 in the shroud panel side mounting part 31a as shown in FIG. 18, causes disturbance in the impact sensor 34, relatively easy deformation of the retainer support member 75 prevents the impact load from being transmitted to the center stay 31 as it is, thereby ensuring the detection accuracy of the impact sensor 34.

The above-mentioned flanges 75e and 75e for lowering the rigidity of the retainer support member 75 only against load in the front-to-rear direction correspond to a vulnerable site. The vulnerable site is not limited to the structure in this embodiment. For example, the rigidity of the retainer support member 75 in the front-to-rear direction may be intentionally weakened by forming notches in the bent parts of the retainer support member 75 or those of the after-mentioned auxiliary support member 76.

The auxiliary support member 76 spanning the arm 75b of the retainer support member 75 and the shroud panel side mounting part 31a of the center stay 31 is made of a plate material both ends of which are bent upward. Its one end is fastened to the front face of the center stay 31 by a bolt, while the other end is joined by spot welding to the rear face of the retainer support member 75.

Specifically, the auxiliary support member 76 includes: a center stay mounting part 76a mounted at one end of the auxiliary support member 76 to the center stay 31; a joining part 76b joined at the other end thereof to the retainer support member 75; and an arm 76c connecting between the center stay mounting part 76a and the joining part 76b. The auxiliary support member 76 further includes, frontwardly of the joining part 76b, a restriction wall 76d extending substantially horizontally in the front-to-rear direction and an upper guide 76e (a second guide) extending frontward and upward from the front end of the restriction wall 76d. The restriction wall 76d is formed a predetermined distance upwardly from the abutment 75c of the retainer support member 75 to restrict the upward movement of the supported part 71g of the bumper retainer 71 positioned on top of the abutment 75c when the bumper face 3 or the front grille 1 falls out of position relatively upward, for example, during travel on a rough road. The predetermined distance is determined taking into consideration, for example, the workability in positioning the supported part 71g of the bumper retainer 71 on the abutment 75c of the retainer support member 75 and the upper limit of upward out-of-position of the supported part 71g.

The upper guide 76e is used to vertically position the bumper retainer 71 so that, in assembling from front the bumper retainer 71 with the front grille 1 and the bumper face 3 mounted thereto to the retainer support member 75 with the center stay 31 mounted to the shroud panel 2 in the mounting manner as shown in Embodiment 1, the support part 71g can surely be positioned on the retainer support member 75. The provision of the upper guide 76e enables the supported part 71g of the bumper retainer 71 to surely be positioned on the abutment 75c of the retainer support member 75 even if the supported part 71g is located above a predetermined position. Furthermore, since there is no need to assemble the bumper retainer 71 while visually checking the position of the abutment 75c of the retainer support member 75, the assemblability can be enhanced.

Like the retainer support member 75, the auxiliary support member 76 is also bent at the right and left ends, thereby enhancing its rigidity as a whole. Specifically, the right and left ends of the auxiliary support member 76 are bent upward to surely support the retainer support member 75 to the center stay 34. As described above, if the impact sensor 34 mounted to the center stay 31 has a potential problem of disturbance, notches are formed in the bent parts of the auxiliary support member 76. This prevents an impact in the front-to-rear direction from being transmitted to the center stay 31 as it is and causing disturbance in the impact sensor 34.

Even if the front grille 1 is of large size, is largely inclined so that its lower side is located frontwardly of its upper side and formed in an arcuate shape in top view, the provision of the retainer support member 75 having the above structure surely prevents the widthwise middle part of the front grille 1 from largely deforming downward owing to its own weight. Thus, the bumper face 3 can be prevented from deforming owing to the weight of the front grille 1 and thereby creating a gap between the front grille 1 and the bonnet 8. In other words, the vehicle front end can be prevented from being disfigured.

Furthermore, as shown in FIG. 18, the center stay 31, the retainer support member 75 and the auxiliary support member 76 are joined together. Therefore, although the retainer support member 75 is provided, there is no need to do an additional work to mount the retainer support member 75 to the vehicle body and the retainer support member 75 can be mounted together with the center stay 31. This does not deteriorate the assemblability of the vehicle front end.

Furthermore, since the bumper retainer 71 of substantially C-shaped cross section is disposed below the front grille 1 and behind the bumper face 3, connected to the bumper face 3 and supported by the retainer support member 75 extending upward from the bumper beam side mounting part 31b of the center stay 31, the front grille 1 can be supported from below by the bumper retainer 71 and the rigidity of the bumper face 3 can be enhanced, thereby preventing the sagging of the bumper face 3 with higher reliability.

Furthermore, the bumper retainer 71 has a plurality of outside ribs 71e, 71e, arranged widthwise on the top to extend in the front-to-rear direction and a plurality of inside ribs 71f, 71f, . . . arranged on the back to extend in the front-to-rear direction. This enhances the rigidity of the entire bumper retainer 71, thereby providing more secure support of the front grille 1 and the bumper face 3.

Since the rear ends of the outside ribs 71e, 71e, . . . are connected to each other by the shelf 71h extending in the vehicle widthwise direction, the rigidity of the bumper retainer 71 can be further enhanced. In addition, since the front grille 1 is positioned on top of the shelf 71h, the front grille 1 can surely be supported from below over the entire width, thereby enhancing the supporting stability.

Furthermore, the retainer support member 75 for supporting the bumper retainer 71 from below has a guide 75d formed to extend frontward and downward from the front end of the abutment 75c of the bumper retainer 71, while the auxiliary support member 76 connecting the retainer support member 75 and the center stay 31 at their upper positions also has an upper guide 76e formed at the front end to extend frontward and upward. The guides 75d and 76e can surely position the supported part 71g of the bumper retainer 71 onto the abutment 75c of the retainer support member 75. Specifically, when the bumper retainer 71 with the front grille 1 and the bumper face 3 mounted thereto is assembled to the retainer support member 75, it can be easily positioned onto the abutment 75c of the retainer support member 75 without assembling it while visually checking the position of the abutment 75c. This improves the assemblability.

Furthermore, the auxiliary support member 76 has a restriction wall 76d provided rearwardly of the guide 76e and above the abutment 75c of the retainer support member 75 to extend substantially horizontally in the front-to-rear direction. This prevents the supported part 71g of the bumper retainer 71 put on the abutment 75c from largely falling out of position relatively upward, for example, during travel on a rough road. Therefore, the front grille 1 or the bumper face 3 can be prevented from falling out of position and thereby disfiguring the vehicle front end.

Since the retainer support member 75 is formed substantially in a lateral U-shaped cross section by bending its right and left ends, the rigidity of the retainer support member 75 can be enhanced. In addition, the part of the retainer support member 75 facing the vehicle front, i.e., the joining part 75a, has flanges 75e and 75e formed by the bending of its right and left ends. Therefore, when impact load is placed from front onto the retainer support member 75, the flanges 75e and 75e open to the right and left to easily rearwardly deform the retainer support member 75. This prevents impact load from being placed through the retainer support member 75 on the impact sensor 34 mounted to the center stay 31 as it is and causing disturbance in the impact sensor 34.

Embodiment 3

Figure 19:
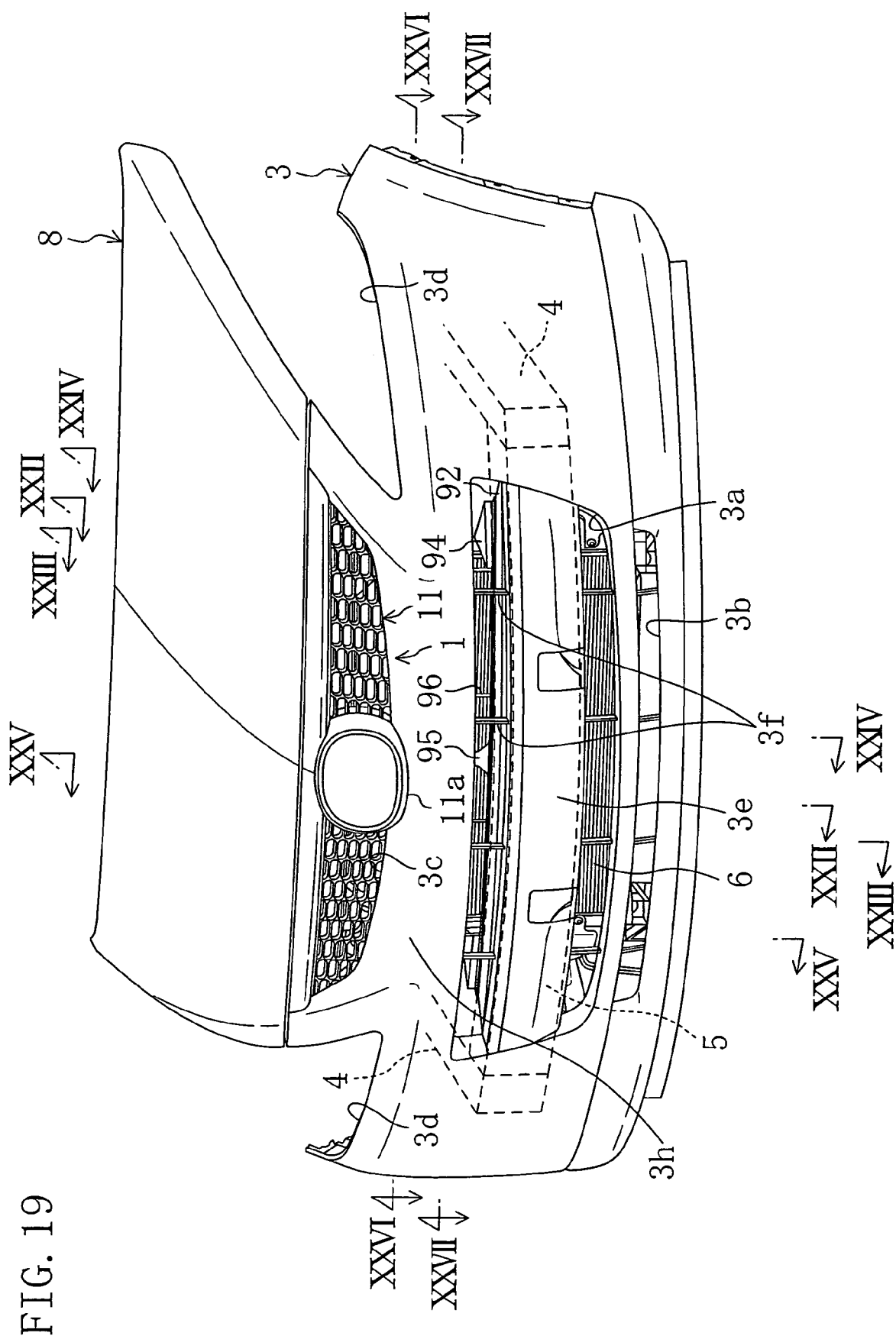
FIG. 19 is a perspective view showing a schematic structure of a vehicle front end according to Embodiment 3 of the present invention.

FIG. 19 shows a vehicle front end structure according to Embodiment 3 of the present invention. Specifically, FIG. 19 schematically illustrates essential components of the vehicle front end structure, such as a front grille 1, a bumper face 3 (a front bumper face) and a bonnet 8. The rest of the vehicle front end structure, such as head lights and fog lamps, is not given in the figure. The vehicle front end structure of Embodiment 3 is different from those of Embodiments 1 and 2 only in the support structure for the front grille 1 and, therefore, the same parts are identified by the same reference numerals in the following description.

The bumper face 3 is constituted by a resin plate material molded in a given shape and disposed to cover the vehicle front end. A lower part of the bumper face 3 has a bumper face opening 3a (an opening) formed as a vent in the middle thereof, and has a bumper face lower opening 3b formed as another vent below the bumper face opening 3a. The top end of the bumper face 3 has a grille recess 3c formed in the middle thereof and the front grille 1 is placed in the grille recess 3c. The top end of the bumper face 3 also has head lamp recesses 3d and 3d formed to the right and left of the grille recess 3c and their associated head lamps are placed in the head lamp recesses 3d and 3d. In FIG. 19, the reference numeral 3h indicates a face part constituting the part of the bumper face 3 above the bumper face opening 3a.

The bumper face opening 3a is located frontwardly of a bumper beam 5 connecting the front ends of front side frames 4 and 4 that are located on the right and left of the vehicle body in the vehicle widthwise direction and extend in the front-to-rear direction of the vehicle. In the opening 3a, a cover 3e is placed to extend in the vehicle widthwise direction and cover the front side of the bumper beam 5. The bumper face opening 3a is provided with a plurality of ribs 3f, 3f, . . . (fins) extending vertically from its periphery to the cover 3e, thereby enhancing the rigidity of the cover 3e.

An urethane material 10 (a shock absorbing material) for shock absorption is disposed between the front side of the bumper beam 5 and the cover 3e in the bumper face opening 3a (see FIGS. 20 to 25). A bumper beam cover 91 as described later is disposed over the urethane material 10 and the bumper beam 5 to cover their top surfaces. The provision of the bumper beam cover 91 in this manner prevents the top surfaces of the bumper beam 5 and the urethane material 10 from being exposed through the bumper face opening 3a.

As shown in FIGS. 7, 20 and 22 to 25, the front grille 1 includes: a grille body 11 inclined so that its lower side is located frontwardly of its upper side and formed in an arcuate shape in top view so that its widthwise middle part protrudes frontward; and a mounting part 12 attached to the rear of the grille body 11 and connected to a shroud panel 2 (a shroud) located rearwardly of the front grille 1. The grille body 11 and the mounting part 12 are fastened to each other by bolts (not shown). The grille body 11 is formed in the widthwise middle with an emblem part Ha designed in the shape of a corporate emblem of the maker.

Figure 22:
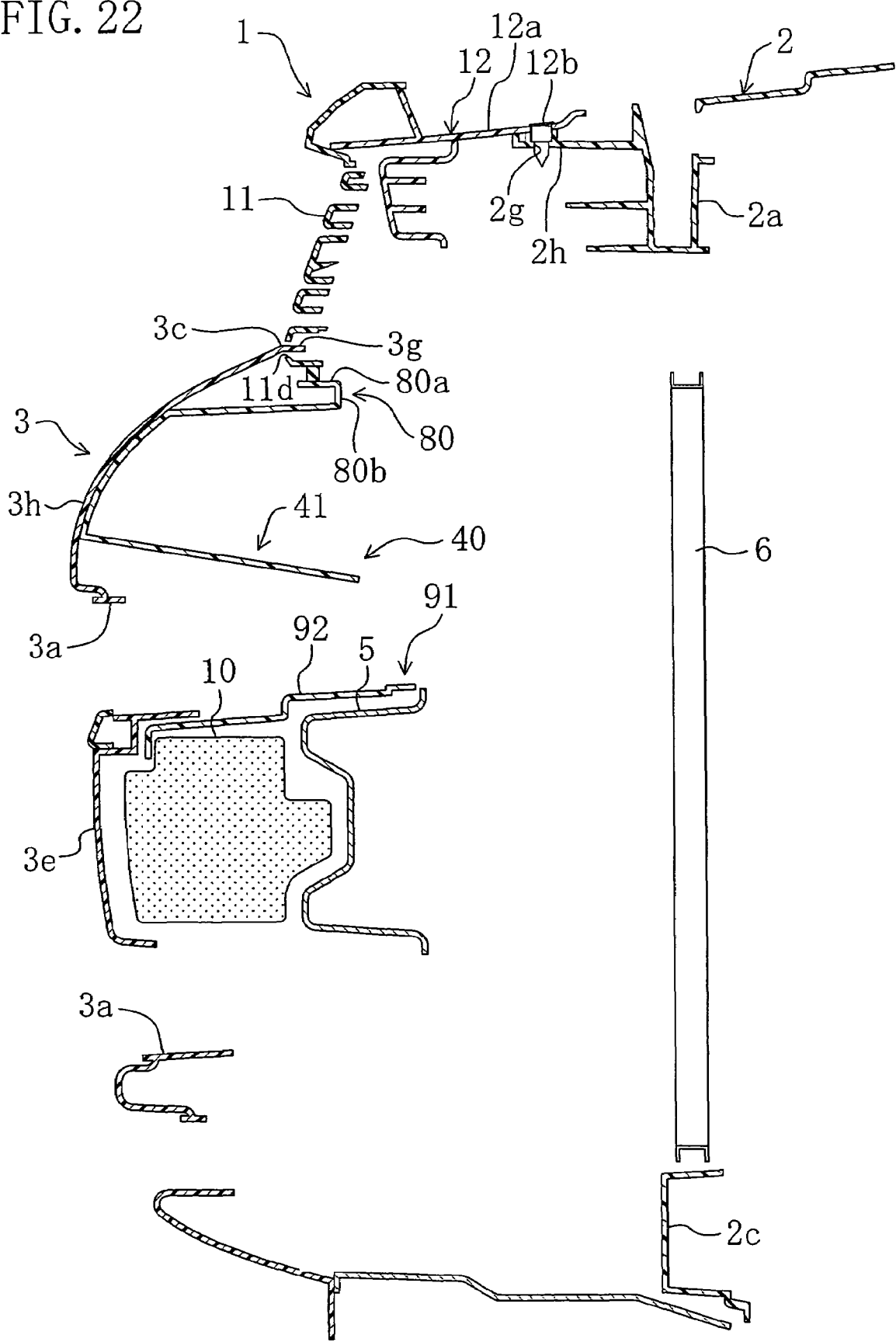
FIG. 22 is a cross-sectional view taken along the line XXII-XXII in FIG. 19.

Furthermore, the front grille 1 is connected at the upper side with a shroud upper part 2a of the shroud panel 2 and engaged at the lower side with the periphery of the grille recess 3c of the bumper face 3 (see FIG. 22).

Specifically, the mounting part 12 of the front grille 1 has an upper plate 12a formed along the rear side of the grille body 11 of substantially arcuate shape as viewed from above. The upper plate 12a has a plurality of (two in this embodiment) mounting holes 12b and 12b formed in the vicinity of the widthwise middle thereof towards the rear of the vehicle to connect the front grille 1 to the shroud upper part 2a. The front grille 1 and the shroud panel 2 are connected to each other by inserting bolts into the mounting holes 12b and 12b and the after-mentioned associated mounting holes 2g and 2g formed in the shroud panel 2 and fastening them by the bolts.

Figure 20:
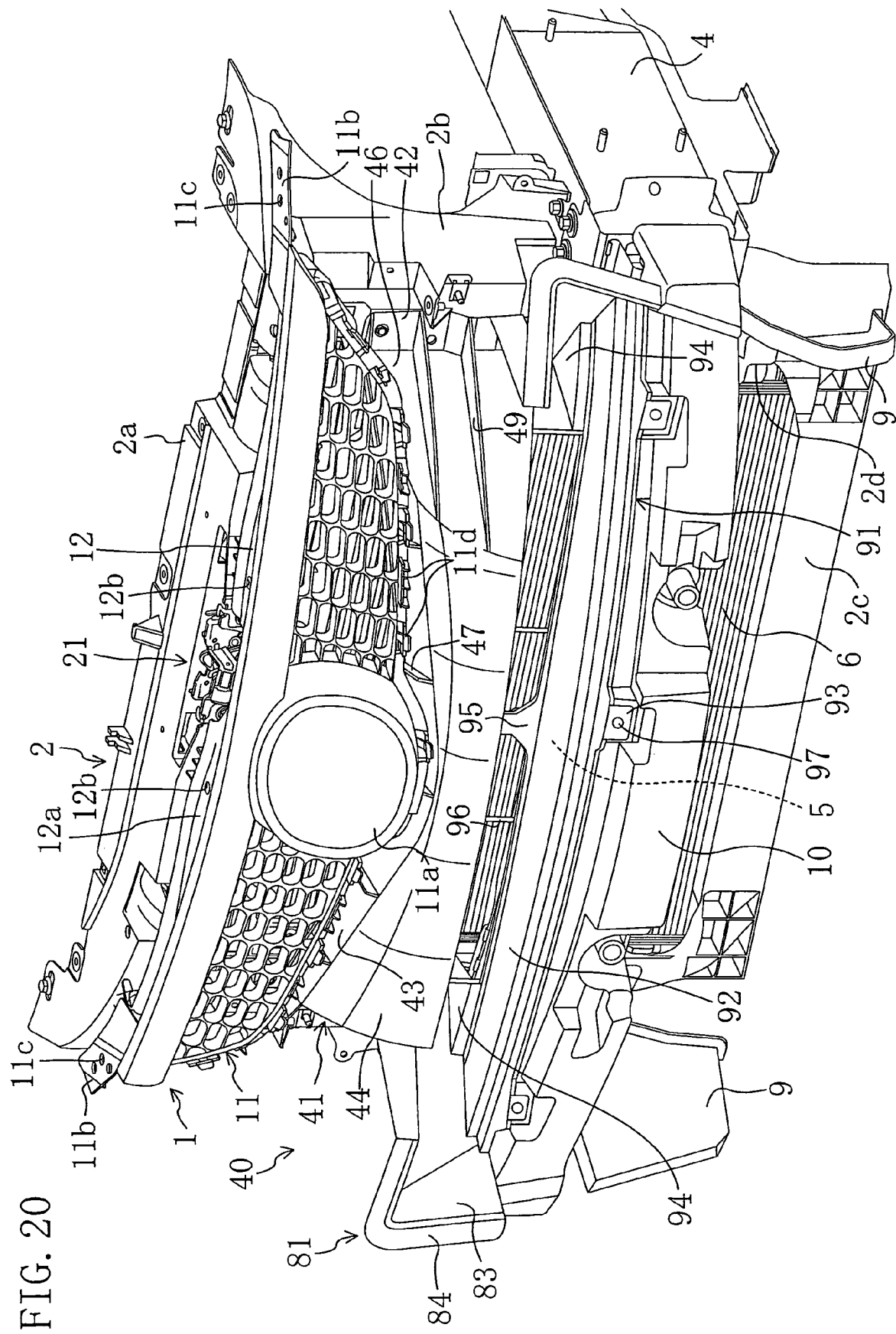
FIG. 20 is a perspective view showing the schematic structure of the vehicle front end from which a bumper face is removed.

As shown in FIGS. 7 and 20, the grille body 11 of the front grille 1 is provided at the right and left ends with extension connecting parts 11b and 11b extending towards the rear of the vehicle. Each extension connecting part 11b is formed with a mounting hole 11c. The front grille 1 is connected at both ends to the vehicle body by inserting bolts into the mounting holes 11c and the mounting holes (not shown) in the bumper face 3 and the mounting holes (not shown) in the head lamps 7 and 7 and fastening the front grille 1 by the bolts.

As shown in FIGS. 7 and 20, the grille body 11 is formed at the lower end with a plurality of holes 11d, 11d, . . . arranged in the vehicle widthwise direction. The holes 11d, 11d, . . . are configured to engage with associated projections 3g, 3g, . . . formed on the periphery of the grille recess 3c in the bumper face 3 (see FIG. 22). Specifically, the periphery of the grille recess 3c in the bumper face 3 is formed with a plurality of projections 3g, 3g, . . . arranged to curve to the rear of the vehicle in association with the respective positions of the plurality of holes 11d, 11d, . . . formed at the lower end of the grille body 11. The projections 3g, 3g, . . . are engaged in the associated holes 11d, 11d, . . . from the front.

Figure 21:
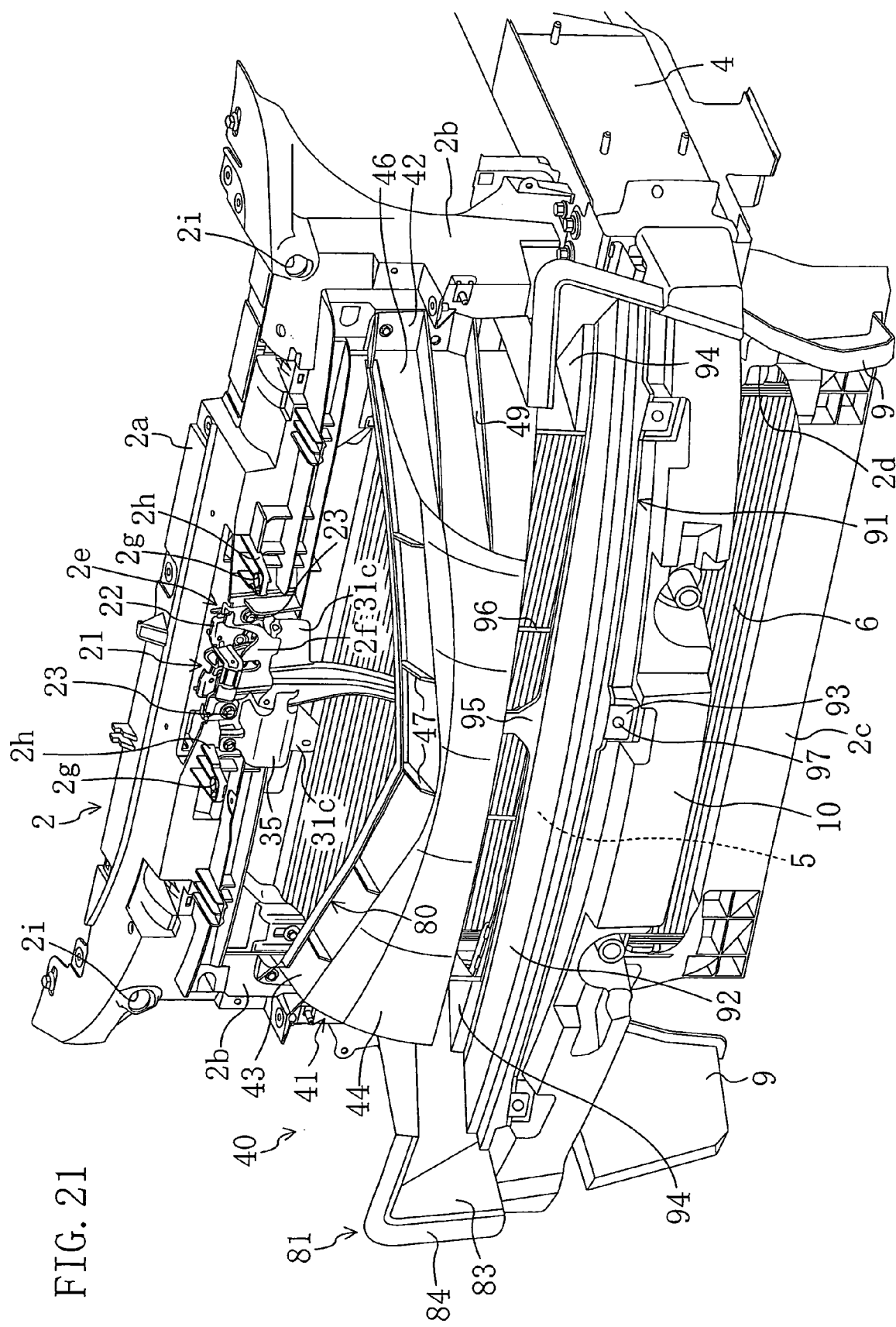
FIG. 21 is a perspective view of the vehicle front end in which a front grille is removed from the state shown in FIG. 20.

The shroud panel 2 is a frame integrally molded from a resin material containing a reinforcing material, such as glass fibers, by injection molding. As shown in FIGS. 20 and 21, the shroud panel 2 includes the shroud upper part 2a (an upper part) extending in the vehicle widthwise direction, vertical members 2b and 2b (right and left side parts) extending downward from the right and left ends, respectively, of the shroud upper part 2a and a shroud lower part 2c extending in the vehicle widthwise direction to connect both the lower ends of the vertical members 2b and 2b and has an opening 2d defined by the shroud upper part 2a, the vertical members 2b and 2b and the shroud lower part 2c.

A radiator 6 is disposed as a cooler rearwardly of the shroud panel 2 to be presented to the opening 2d and is fixed to the shroud panel 2. The shroud panel 2 is fixedly connected at the right and left vertical members 2b and 2b to the right and left front side frames 4 and 4, respectively, whereby the radiator 6 is placed upright on the vehicle body so that its front face is exposed to the wind from the vehicle front during vehicle travel. Specifically, the radiator 6 is positioned behind the bumper face opening 3a formed in the bumper face 3, whereby it can be cooled by the air taken in through the bumper face opening 3a during vehicle travel.

Furthermore, the vertical members 2b and 2b of the shroud panel 2 have their respective seal plates 9 and 9 formed below the portions thereof fixedly connected to the right and left front side frames 4 and 4 to prevent hot air from flowing back from the engine room. Thus, hot air can be prevented from flowing back from the engine room through below the bumper beam 5. On the other hand, as described later, right and left side seals 81 and 81 (seal plates) formed on a front grille support member 40 prevent hot air from flowing back from the engine room through above the portions of the vertical members 2b and 2b fixedly connected to the right and left front side frames 4 and 4.

Figure 23:
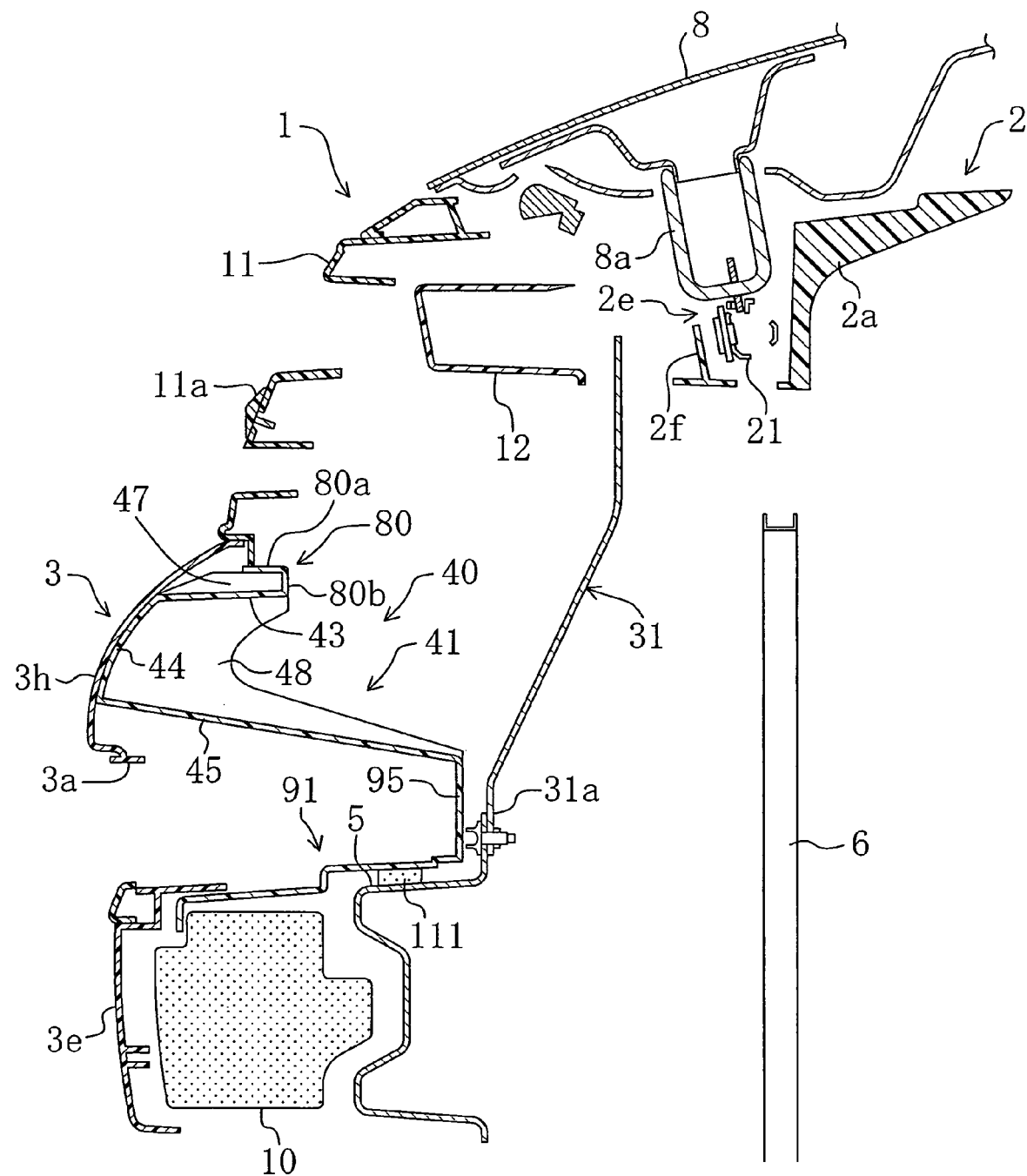
FIG. 23 is a cross-sectional view taken along the line XXIII-XXIII in FIG. 19.

As shown in FIGS. 21 and 23, the shroud upper part 2a of the shroud panel 2 is formed, on the front side and in the middle, with a lock housing 2e for housing a bonnet lock 21. The lock housing 2e is formed in the shape of a pocket to open upward at the front surface of the shroud upper part 2a. A base plate 22 of the bonnet lock 21 is fixedly fastened to a front part 2f constituting part of the lock housing 2e and mounting flanges 31c and 31c of the after-mentioned center stay 31 by bolts 23 and 23 (see FIG. 21) with the bonnet lock 21 inside the lock housing 2e (see FIG. 23). As shown in FIG. 21, the upper side of the front part 2f is formed, substantially in the widthwise middle, with a slit in which a striker 8a of substantially U-shape provided on the bonnet 8 (see FIG. 23) can be inserted so that the striker 8a can be engaged with the bonnet lock 21.

As shown in FIGS. 21 and 22, the shroud upper part 2a of the shroud panel 2 is formed with extensions 2h and 2h extending frontward in correspondence with the mounting holes 12b and 12b in the mounting part 12 of the front grille 1. The extensions 2h and 2h are formed with mounting holes 2g and 2g individually vertically passing through the associated extensions 2h and 2h. The front grille 1 can be fixedly mounted to the shroud panel 2 by inserting bolts into the mounting holes 2g and 2g and the mounting holes 12b and 12b in the front grille 1 and fastening them by the bolts. Furthermore, the front surface of the shroud upper part 2a is formed at both widthwise ends with round holes 2i and 2i opening towards the vehicle front. The round holes 2i and 2i receive associated projections 12c and 12c (see FIG. 7) projecting from the mounting part 12 of the front grille 1 towards the vehicle rear.

As shown in FIGS. 21 and 23, in front of the widthwise middle of the shroud upper part 2a, a center stay 31 is disposed to connect the lock housing 2e of the shroud panel 2 to the widthwise middle of the bumper beam 5. Specifically, the center stay 31 is connected at one end to the base plate 22 of the bonnet lock 21 in the lock housing 2e and connected at the other end to the rear side of the bumper beam 5, thereby absorbing impact load caused when the striker 8a of the bonnet 8 engages with the bonnet lock 21 from above. Thus, the provision of the center stay 31 prevents the resin shroud panel 2 from being damaged by impact when the bonnet 8 is closed.

Figure 28:
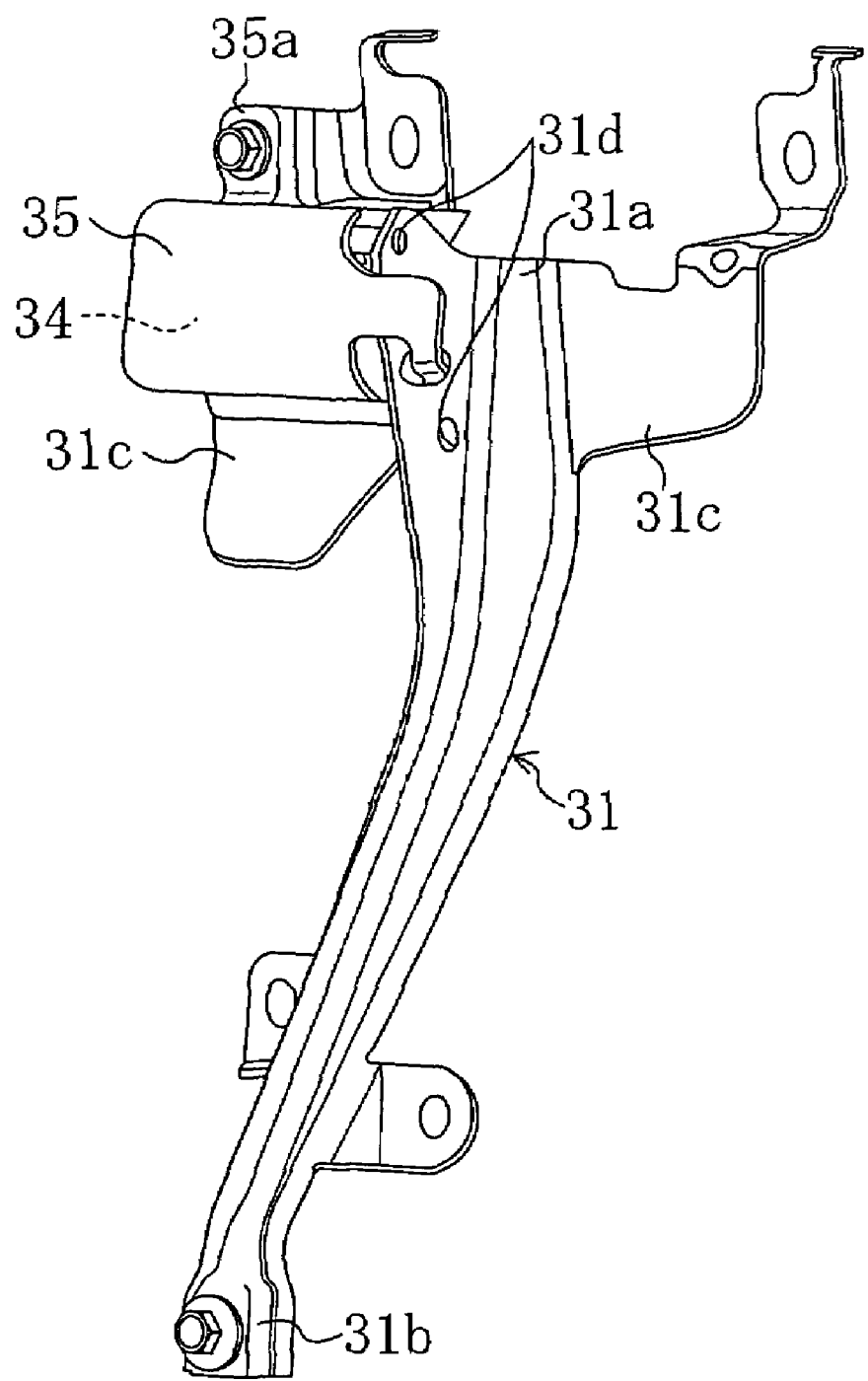
FIG. 28 is a perspective view of a center stay.

As shown in FIG. 28, the center stay 31 is constituted by a metal structural member of substantially lateral U-shaped cross section and its lower end serving as a bumper beam side mounting part 31b is located frontwardly of its upper end serving as a shroud panel side mounting part 31a. In other words, the center stay 31 has such a shape that both the mounting parts 31a and 31b extending substantially upright as viewed from a lateral side are connected by a connecting part extending rearward with approach towards the top end.

The center stay 31 is fastened at the bumper beam side mounting part 31b to the bumper beam 5 by a bolt. The shroud panel side mounting part 31a has the right and left mounting flanges 31c and 31c extending from the body of lateral U-shaped cross section (body of the center stay) to the right and left, respectively. The center stay 31 is also fastened at the mounting flanges 31c and 31c to the shroud panel 2 by bolts.

Furthermore, as shown in FIGS. 21 and 28, the shroud panel side mounting part 31a of the center stay 31 is provided with an impact sensor 34 for detecting impact. Specifically, a cover 35 of substantially lateral U-shaped cross section is disposed to partly cover the front side of one of the right and left mounting flanges 31c and 31c of the shroud panel side mounting part 31a (the left mounting flange in front view in this embodiment). The impact sensor 34 is placed inside the cover 35. The impact sensor 34 is partly connected to the mounting flange 31c and configured to detect impact transmitted to the center stay 31. Since the bumper beam side mounting part 31b at the lower end of the center stay 31 is connected to the bumper beam 5, impact load from the bumper beam 5 is transmitted through the center stay 31 to the impact sensor 34. Thus, the impact sensor 34 can detect impact load applied to the bumper beam 5, which enables the detection of a collision.

The cover 35 is disposed over the mounting flange 31c of the center stay 31 to have the shape of a lateral letter U in side view and has a flange 35a extending upward from its upper side wall, and the flange 35a is fixedly attached to the mounting flange 31c of the center stay 31.

Figures 29A, 29B:
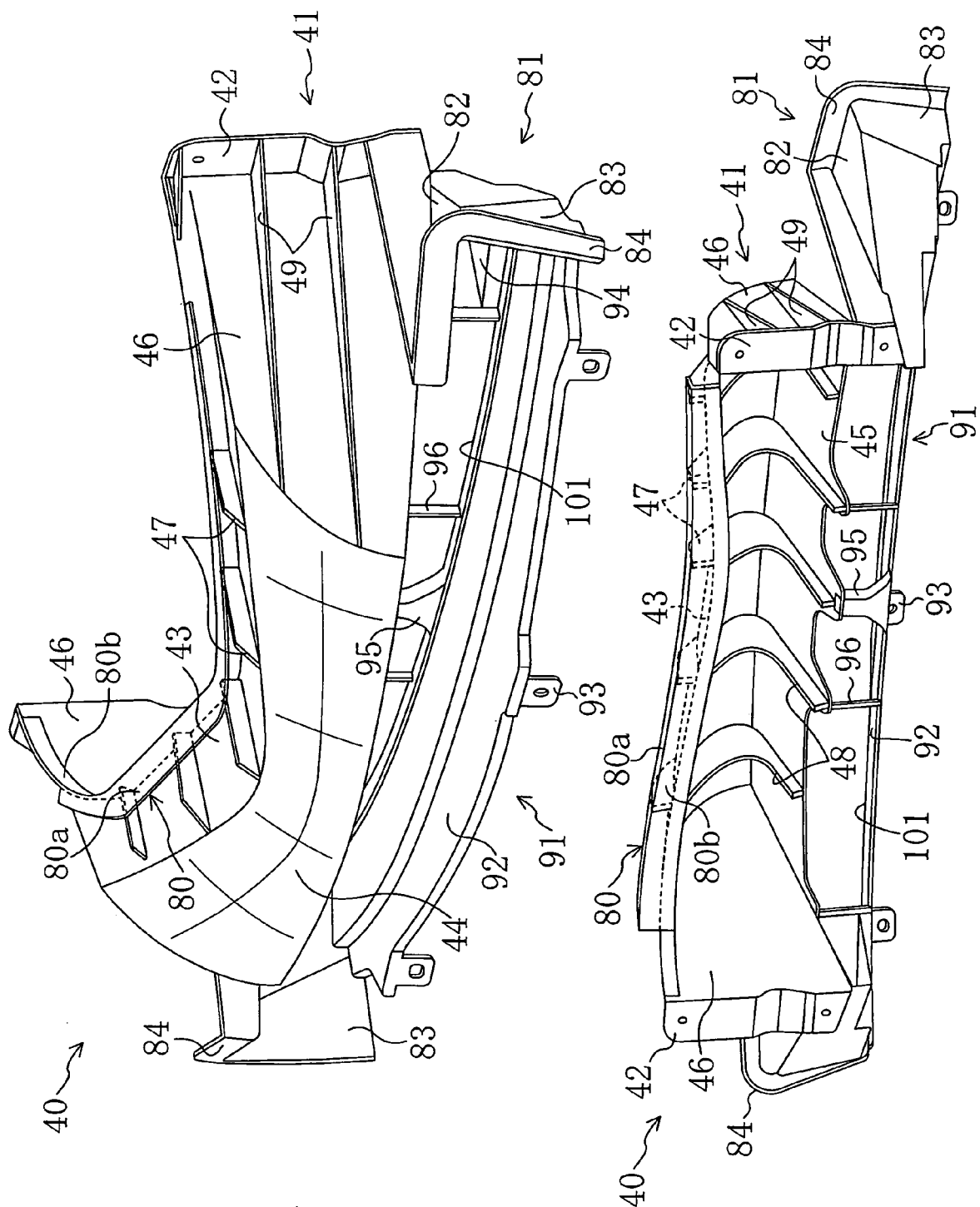
FIG. 29 is a perspective view of a front grille support member.

As shown in FIGS. 20 and 21, a front grille support member 40 for supporting the front grille 1 from below is disposed in front of the center stay 31. The front grille support member 40 is integrally molded from resin and, as also shown in FIG. 29, essentially composed of a front grille support 41 (a face support) for supporting the front grille 1 from below and supporting the bumper face 3 from behind, side seals 81 and 81 (seal plates) for preventing the back flow of hot air in a space above the bumper beam 5, and a bumper beam cover 91 for covering the top surface of the bumper beam 5.

The front grille support 41 is formed in a cross section resembling a lateral letter U to open rearward, disposed to span the front of the opening 2d of the shroud panel 2 in the vehicle widthwise direction, and fixedly mounted, at right and left mounting parts 42 and 42 formed at both widthwise ends, to side parts 2b and 2b (right and left side parts) of the shroud panel 2. Specifically, the front grille support 41 includes: a shelf 43 spanning the right and left mounting parts 42 and 42 and also extending in the front-to-rear direction; a bumper face support 44 extending frontward and downward from the front end of the shelf 43; a lower wall 45 extending rearward from the lower end of the bumper face support 44; and side walls 46 and 46 disposed to close the right and left openings of a lateral-U-shaped structure formed of the shelf 43, the bumper face support 44 and the lower wall 45. The right and left mounting parts 42 and 42 continue to the rear ends of the right and left side walls 46 and 46, respectively.

The shelf 43 is formed to curve so that its widthwise middle part sinks downward and conform to the bottom of the front grille 1. Furthermore, the top of the shelf 43 has a plurality of (five in this embodiment) outside ribs 47, 47, . . . (ribs) extending in the front-to-rear direction and arranged in the vehicle widthwise direction. The outside ribs 47, 47, . . . are formed to have substantially the same height from the top of the shelf 43 and formed at the their rear ends with a support shelf 80 (a second shelf) connecting the outside ribs 47, 47, . . . in the vehicle widthwise direction (see FIGS. 21 and 29). The front grille 1 is placed on the support shelf 80.

More specifically, the support shelf 80 includes: an upper plate 80a provided on rear parts of the top ends of the outside ribs 47, 47, . . . to form spaces with the shelf 43; and a vertical wall 80b provided on the rear end of the upper plate 80a, i.e., on the rear ends of the outside ribs 47, 47, . . . to extend downward from the upper plate 80a. In other words, the shelf 43 is provided to cover the outside ribs 47, 47, . . . from the rear. When the front grille support member 40 is placed under the front grille 1, the support shelf 80 abuts on the bottom of the front grille 1. Thus, the front grille 1 can be supported over its entire bottom, thereby enhancing the supporting stability.

Since, thus, the plurality of outside ribs 47, 47, . . . are provided on the shelf 43 and their rear ends are connected in the vehicle widthwise direction by the support shelf 80, each of the outside ribs 47, 47, . . . can be enhanced in strength, thereby enhancing the rigidity of the shelf 43. In addition, since the front grille 1 is placed on the support shelf 80 and thereby supported over its entire bottom, the supporting stability can be improved. Furthermore, since the front grille 1 is supported by the support shelf 80 having a smaller width in the front-to-rear direction than the shelf 43, the support shelf 80 does not require so high surface precision that would be required in the case of supporting the front grille 1 on the entire surface of the shelf 43. Therefore, the production cost including the processing cost and mold cost for the front grille support 41 can be reduced, thereby enhancing productivity.

Since the front grille support 41 is formed substantially into a lateral-U-shaped cross section opening rearward and has the side walls 46 and 46 disposed on the right and left sides, it has a general form of a box (hexahedron) that opens rearward. Therefore, the front grille support 41 can enhance the rigidity as compared with the case of having only a shelf and can support the front grille 1 with higher reliability.

The front grille support 41 is further provided at its inside with a plurality of inside ribs 48, 48, . . . (inside reinforcement ribs) in correspondence with the widthwise positions of the outside ribs 47, 47, . . . on the shelf 43. The inside ribs 48, 48, . . . extend in the front-to-rear direction across the bottom surface of the shelf 43, the rear surface of the bumper face support 44 and the top surface of the lower wall 45. The provision of the inside ribs 48, 48, . . . for reinforcement on the inside of the front grille support 41 further enhances the rigidity of the front grille support 41 and further improves the stability to support the front grille 1.

In addition, since, as described above, the front grille support member 40 is provided with side walls 46 and 46, this prevents hot air in the engine room from flowing back in front of the radiator 6 along the right and left sides of the shroud panel 2 and mixing with outside air taken in through the opening 3a of the bumper face 3.

Figure 24:
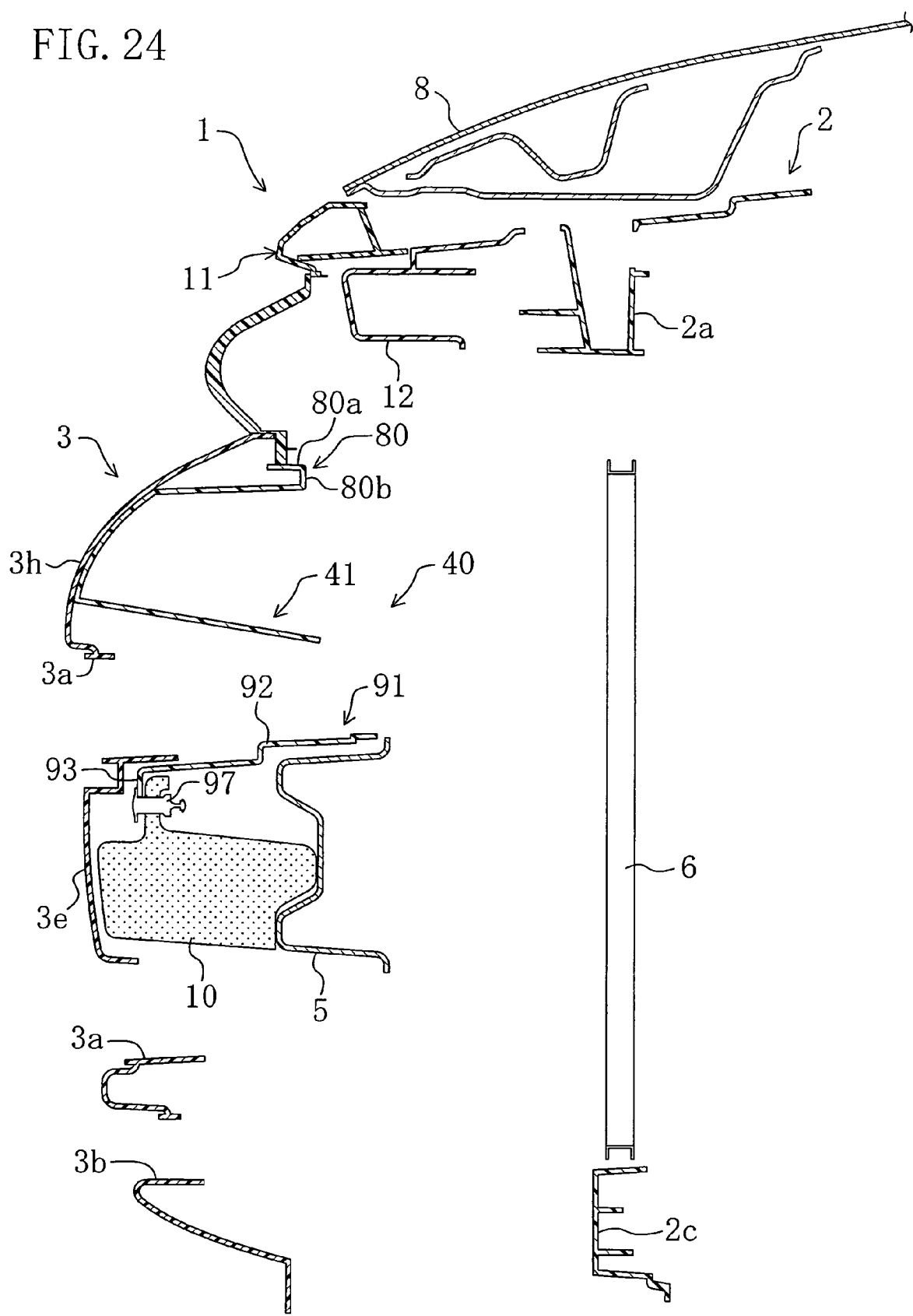
FIG. 24 is a cross-sectional view taken along the line XXIV-XXIV in FIG. 19.
Figure 25:
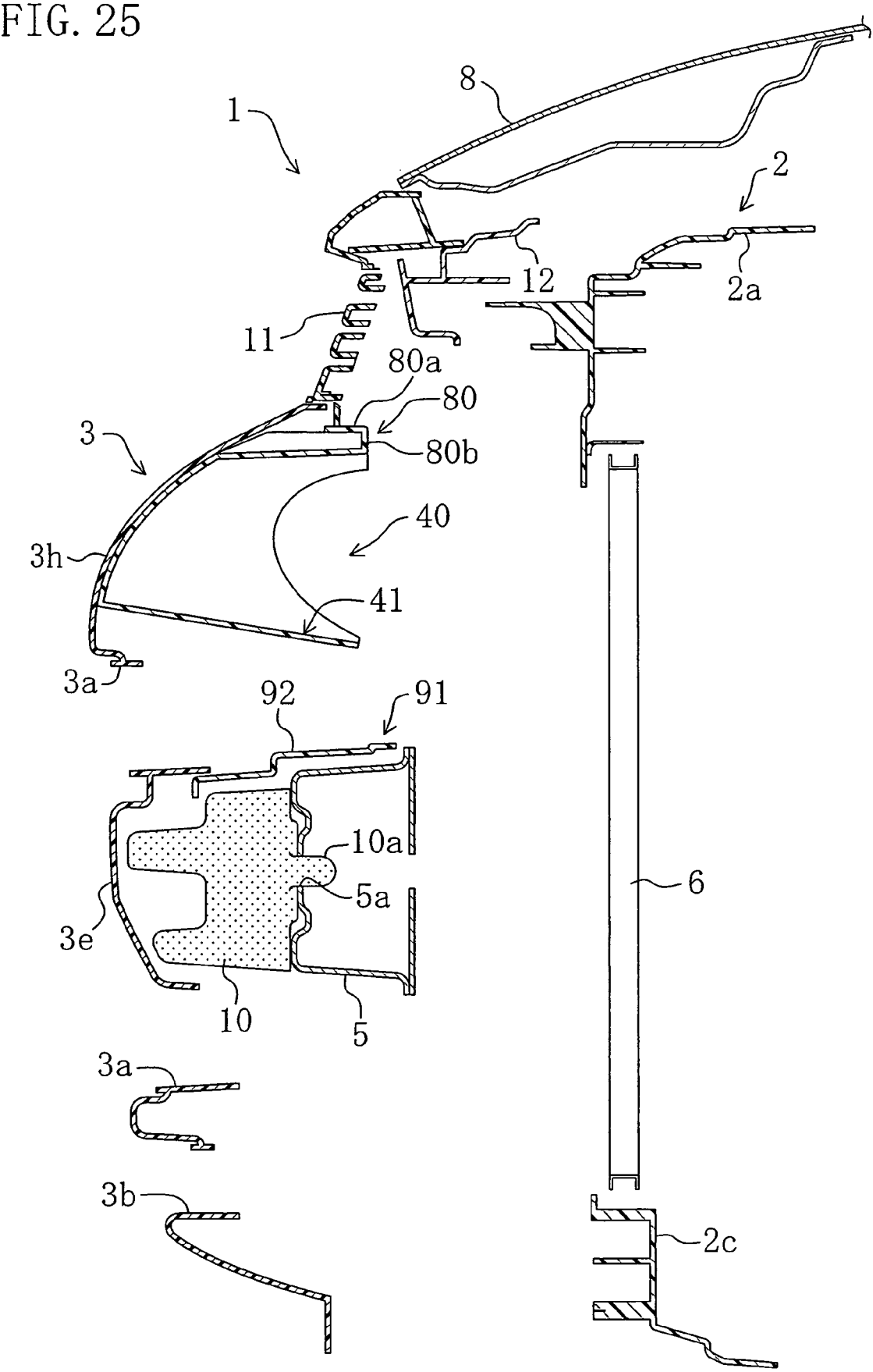
FIG. 25 is a cross-sectional view taken along the line XXV-XXV in FIG. 19.

Furthermore, the shelf 43 of the front grille support member 40 has its front end extending to the vicinity of the back (rear face) of the face part 3h of the bumper face 3 and the bumper face support 44 thereof extends downward to conform to the back (rear face) of the face part 3h (see FIGS. 23 to 25). Thus, the bumper face 3 is supported from behind by the bumper face support 44, thereby enhancing the rigidity. Therefore, even if large rearward load is placed on the bumper face 3, the bumper face 3 can be prevented from largely deforming.

The side walls 46 and 46 and the mounting parts 42 and 42 are also provided with reinforcement ribs 49, 49, . . . extending in the vehicle front-to-rear direction across each associated pair of side wall 46 and mounting part 42. The reinforcement ribs 49, 49, . . . enhances the rigidity of the front grille support 41 in the front-to-rear direction. Therefore, the bumper face 3 can be supported with higher reliability and can surely be prevented from deforming rearward.

The right and left side seals 81 and 81 are provided above the bumper beam 5 to extend frontward from the right and left mounting parts 42 and 42, respectively, and formed substantially in the shape of the letter L in front view. Specifically, as shown in FIG. 29, each side seal 81 includes a top part 82 and a side part 83 extending downward from one side of the top part 82. The side part 83 is located at the outside end of the side seal 81 in the vehicle widthwise direction and formed to provide a partition widthwise dividing the space forming with the associated side part 2b of the shroud panel 2 and the bumper face 3.

Figure 26:
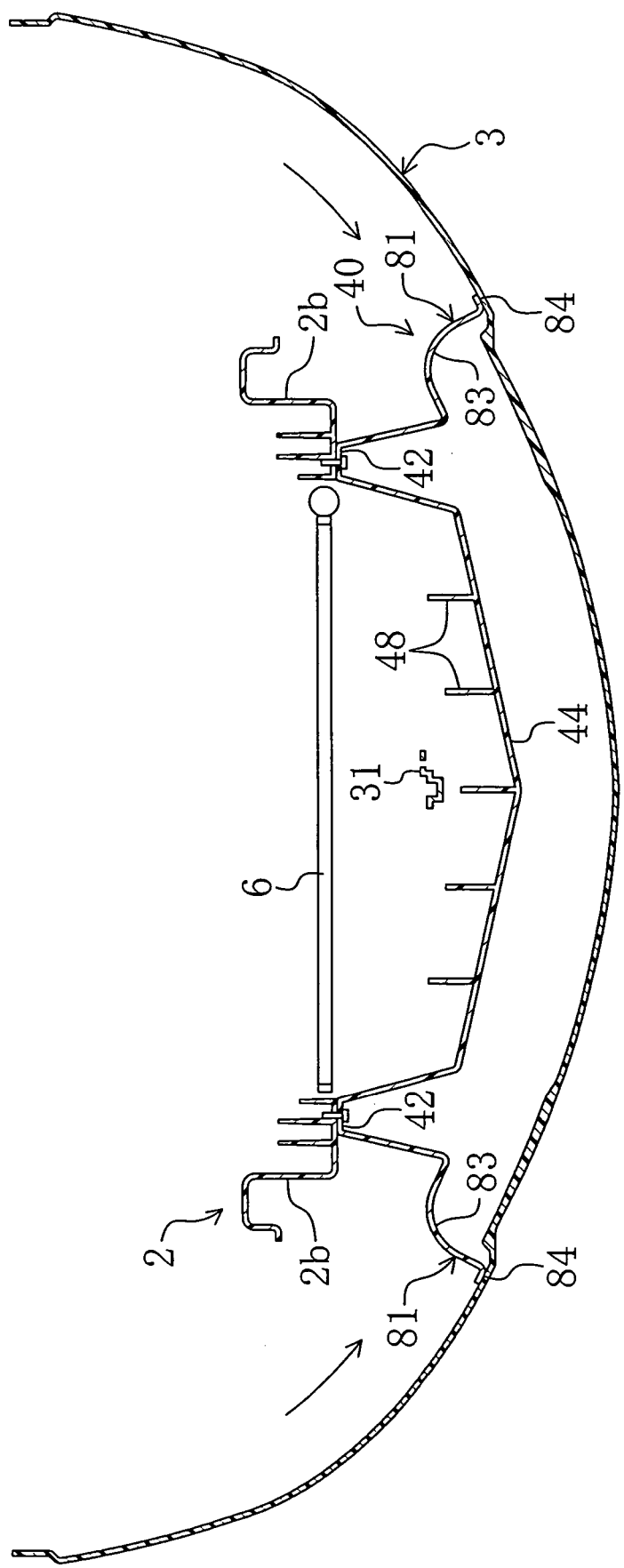
FIG. 26 is a cross-sectional view taken along the line XXVI-XXVI in FIG. 19.
Figure 27:
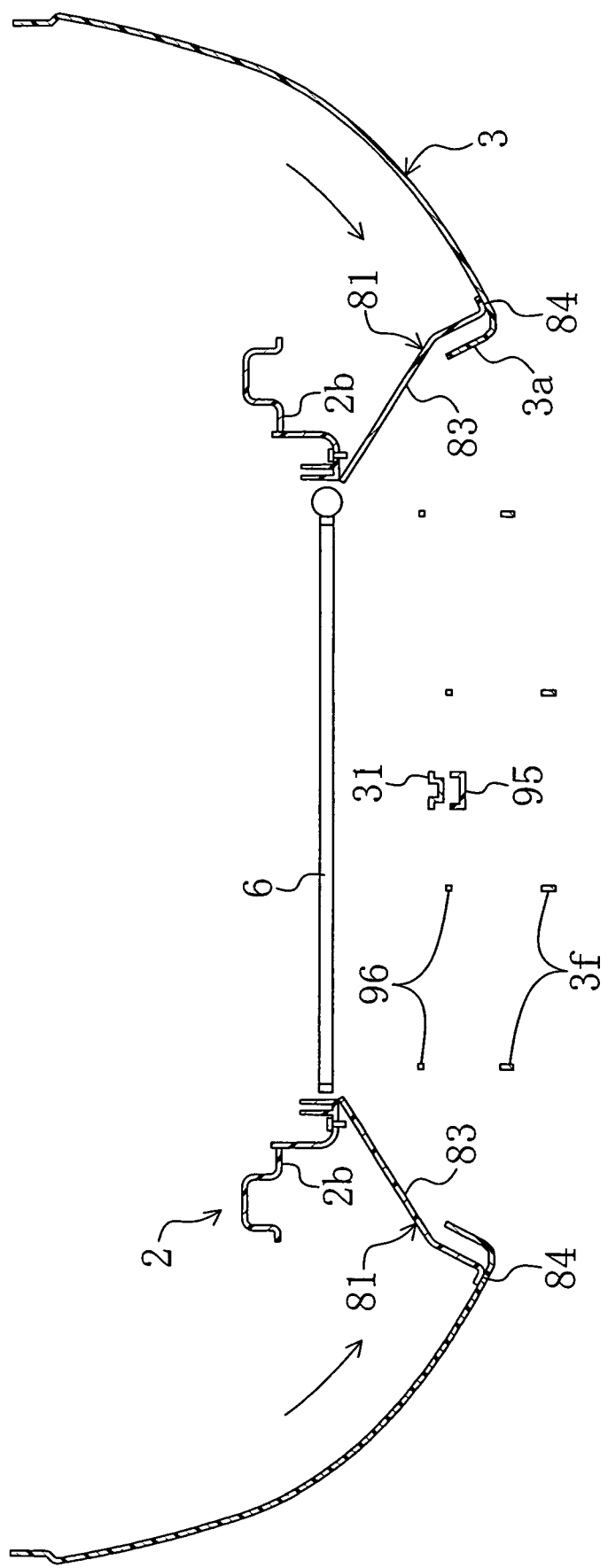
FIG. 27 is a cross-sectional view taken along the line XXVII-XXVII in FIG. 19.

The provision of the above side seals 81 and 81 surely prevents hot air in the engine room from flowing back in front of the radiator 6 along the lateral sides of the shroud panel 2 and mixing with outside air taken in through the opening 3a of the bumper face 3 (see FIGS. 26 and 27, wherein the hot air from the engine room is indicated by the arrows).

In addition, the side seals 81 and 81 are formed in such a shape that they are positioned laterally outward with approach to their front ends. Therefore, the side seals 81 and 81 allow outside air flowing in through the openings 3a and 3b of the bumper face 3 to effectively flow towards the radiator 6 disposed in the opening 2d of the shroud panel 2.

As shown in FIGS. 20 and 21, the bottoms of the side parts 83 and 83 of the side seals 81 and 81 are positioned on the top of the bumper beam 5. Therefore, the bottoms of the side parts 83 and 83 are formed in a shape that conforms to an uneven feature of the top of the bumper beam 5. Furthermore, as also described later, the bottom ends of the side seals 81 and 81 are connected by a flat plate 92 of the bumper beam cover 91, whereby the rigidity of the side seals 81 and 81 in the vehicle widthwise direction can be enhanced.

Flanges 84 and 84 are formed on the front ends of the side parts 83 and 83 and top parts 82 and 82 of the side seals 81 and 81 to conform the back (rear surface) of the bumper face 3 disposed in their front (see FIGS. 26 and 27). This surely prevents hot air in the engine room from entering in front of the radiator 6 through between the front ends of the side seals 81 and 81 and the back of the bumper face 3.

The bumper beam cover 91 is disposed under the side seals 81 and 81 and configured to cover the top of the bumper beam 5. Specifically, as shown in FIGS. 20 and 21, the bumper beam cover 91 includes a flat plate 92 formed to connect the bottom ends of the side seals 81 and 81 and cover the tops of the bumper beam 5 and the urethane material 10 disposed in front of the bumper beam 5, and is connected to the front side of the urethane material 10 by mounting flanges 93, 93 and 93 (engagement parts) provided at several points (three in this embodiment) of the widthwise extending front edge of the flat plate 92 to extend downward.

As also shown in FIG. 24, each mounting flange 93 is positioned at the front face of the urethane material 10 and, in this state, engaged thereto by a pin 97. Thus, the front side of the urethane material 10 can be supported by the bumper beam cover 91. As shown in FIG. 25, the urethane material 10 is provided at the rear face (the back) with a plurality of (two in this embodiment) projections 10a and 10a projecting rearward and is mounted to the bumper beam 5 by inserting the projections 10a and 10a into holes 5a and 5a formed in the front face of the bumper beam 5. If the urethane material 10 is supported to the bumper beam 5 only by engagement of the projections 10a and 10a, its front side might fall frontward and downward owing to its own weight. In this embodiment, however, the front side of the urethane material 10 is supported by the bumper beam cover 91 as described above. Therefore, the falling of the urethane material 10 can surely be prevented.

Furthermore, as described above, since the bumper beam cover 91 is provided to cover the top of the bumper beam 5, only the bumper beam cover 91 can be seen from the vehicle front through the opening 3a of the bumper face 3 and the top of the metal bumper beam 5 cannot directly be seen through the opening 3a. This improves the appearance of the vehicle front end. In addition, since the bumper beam cover 91 is connected through the side seals 81 and 81 to the mounting parts 42 and 42 to be mounted to the right and left side parts 2b and 2b of the shroud panel 2, the bumper beam cover 91 can be mounted in place on the bumper beam 5 without forming any mounting hole or the like in the top surface of the bumper beam 5. Therefore, the top of the bumper beam 5 can be covered without any impairment of the function of the bumper beam 5, such as rigidity deterioration, thereby improving the appearance of the vehicle front end.

The top surface of the urethane material 10 is positioned below the top of the bumper beam 5 and the flat plate 92 of the bumper beam cover 91 is formed with a level difference correspondingly. The flat plate 92 is formed to be positioned a predetermined distance upward from each of the top surfaces of the bumper beam 5 and the urethane material 10. Furthermore, as shown in FIG. 23, a plurality of cushions 111, 111, . . . are arranged at intervals in the vehicle widthwise direction between the top of the bumper beam 5 and a part of the flat plate 92 covering it. The cushions 111, 111, . . . are made of, for example, a foam. The provision of the cushions 111, 111, . . . between the flat plate 92 of the bumper beam cover 91 and the bumper beam 5 in the above manner prevents the flat plate 92 from hitting the bumper beam 5 owing to vibrations or other factors and thereby causing abnormal noises or other undesirable phenomena.

Furthermore, as shown in FIGS. 20 and 21, the bumper beam cover 91 is provided with seal parts 94 and 94 extending rearward from the right and left ends of the flat plate 92 to fill gaps created below the side seals 81 and 81 between the bumper beam 5 and each of the vertical members 2b and 2b of the shroud panel 2. The provision of the seal parts 94 and 94 prevents the back flow of hot air from the engine room with higher reliability.

As also shown in FIG. 29, the rear edge of the flat plate 92 of the bumper beam cover 91 is provided in the vicinity of the widthwise middle with a center stay cover 95 vertically extending in an opening 101 (air inlet) formed between the flat plate 92 and the front grille support 41 and connecting to the lower wall 45 of the front grille support 41. The center stay cover 95 is formed wider than the center stay 31 spanning the bumper beam 5 and the shroud upper part 2a of the shroud panel 2 and covers the front side of the center stay 31 (see FIG. 23).

The provision of the center stay cover 95 in this manner eliminates a disadvantage that the center stay 31 is directly seen from in front of the vehicle. Therefore, it can surely be prevented that the metal center stay 31 is seen through the opening 3a of the bumper face 3 and that the vehicle front end is thereby disfigured.

In addition, since the center stay cover 95 connects between the flat plate 92 of the bumper beam cover 91 and the lower wall 45 of the front grille support 41, it can support the widthwise middle part of the lower wall 45 from below, which enhances the vertical rigidity of the front grille support 41 including the lower wall 45.

Furthermore, the rear edge of the flat part 92 has a plurality of (four in this embodiment) columnar connecting parts 96, 96, . . . arranged at intervals in the vehicle widthwise direction and, like the center stay cover 95, vertically extending in the opening 101 and connecting to the lower wall 45 of the front grille support 41. The provision of the connecting parts 96, 96, . . . makes it possible to support the lower wall 45 of the front grille support 41 from below at the plural widthwise positions, thereby further enhancing the vertical rigidity of the front grille support 41.

As shown in FIG. 27, the connecting parts 96, 96, . . . are formed substantially in the same widthwise location as the vertically extending ribs 3f, 3f, . . . disposed in the opening 3a of the bumper face 3. Specifically, the connecting parts 96, 96, . . . are disposed to hide behind the ribs 3f, 3f, . . . of the bumper face 3 when viewed from in front of the vehicle. This prevents the vehicle front end from being disfigured and concurrently prevents the connecting parts 96, 96, . . . from interfering with the flow of outside air taken in through the bumper face opening 3a.

As described so far, according to this embodiment, since the front grille support member 40 is disposed at the front of the shroud panel 2 so that it is mounted to the right and left vertical members 2b and 2b of the shroud panel 2 through the mounting parts 42 and 42 provided at its widthwise ends and the front grille 1 is supported from below by the shelf 43 of the front grille support member 40 extending in the front-to-rear direction, the front grille 1 can be prevented from deforming downward owing to its own weight. Therefore, the bumper face 3 supporting the front grille 1 from below can be prevented from largely deforming, thereby preventing the creation of an unsightly gap between the front grille 1 and the bonnet 8 and in turn deterioration of the appearance of the vehicle front end.

Furthermore, the front grille support 41 includes a bumper face support 44 extending frontward and downward from the front end of the shelf 43, a lower wall 45 extending from the lower end of the bumper face support 44 toward the rear of the vehicle, and side walls 46 and 46 provided to close the widthwise end openings of the lateral-U-shaped structure formed by the shelf 43, the bumper face support 44 and the lower wall 45 and is generally formed in the shape of a box opening rearward. Therefore, the front grille support 41 can enhance its entire rigidity and support the front grille 1 with higher reliability.

Since the inside of the front grille support 41 has a plurality of inside ribs 48, 48, . . . for reinforcement extending in the front-to-rear direction and arranged in the vehicle widthwise direction, this further enhances the rigidity of the front grille support 41 and in turn supports the front grille 1 with higher reliability.

Since the top surface of the shelf 43 of the front grille support 41 has a plurality of outside ribs 47, 47, . . . extending in the front-to-rear direction and arranged in the vehicle widthwise direction and the front grille 1 is supported by the support shelf 80 connecting the rear parts of the top ends of the outside ribs 47, 47, . . . in the vehicle widthwise direction, the front grille 1 can be supported over its entire bottom. In addition, since the support shelf 80 has a small contact area and does not require so high surface precision as compared with the case of supporting the front grille 1 on the entire surface of the shelf 43, this improves the productivity of the front grille support member 40.

Furthermore, since the bumper face support 44 of the front grille support 41 is disposed to conform to the back of the bumper face 3 and supports the bumper face 3 from behind, this enhances the rigidity of the bumper face 3 in the front-to-rear direction and prevents the bumper face 3 from largely deforming rearward. In addition, since the rigidity of the front grille support 41 in the front-to-rear direction can be further enhanced by providing the ribs 49 and 49 extending in the front-to-rear direction across the side walls 46 and 46 and the mounting parts 42 and 42 of the front grille support 41, the rigidity of the bumper face 3 can be enhanced with higher reliability.

According to this embodiment, since the front grille support member 40 is disposed at the front of the shroud panel 2 and includes the mounting parts 42 and 42 mounted to the right and left side parts 2b and 2b of the shroud panel 2 and the bumper beam cover 91 spanning the mounting parts 42 and 42 to cover the top of the bumper beam 5, the top of the metal bumper beam 5 can be hidden even when viewed through the bumper face opening 3a, thereby preventing the vehicle front end from being largely disfigured. In addition, since the bumper beam cover 91 is supported through the mounting parts 42 and 42 to the right and left side parts 2b and 2b of the shroud panel 2, this eliminates the need to provide any mounting hole in the bumper beam 5 and thereby prevents the rigidity of the bumper beam 5 form being deteriorated.

Since the front edge of the bumper beam cover 91 is provided with a plurality of mounting flanges 93, 93, . . . extending downward and each mounting flange 93 is engaged by a pin 97 to the front side of the urethane material 10 disposed in front of the bumper beam 5, the front side of the urethane material 10 can be supported by the bumper beam cover 91 without providing any additional support member, which surely prevents the frontward falling of the urethane material 10.

Furthermore, the cushions 111, 111, . . . are disposed to be sandwiched between the top of the bumper beam 5 and the bottom of the bumper beam cover 91. Therefore, even if vibrations occur in the vehicle body, for example, during travel on a rough road, the cushions 111, 111, . . . can absorb the vibrations of the bumper beam cover 91 and prevent the bumper beam cover 91 from hitting the bumper beam 5 and thereby producing abnormal noises.

Since the front grille support member 40 has side seals 81 and 81 formed to extend upward and in the front-to-rear direction from the widthwise ends of the bumper beam cover 91, the back flow of hot air from the engine room can be prevented without mounting any additional special member. In addition, since the side seals 81 and 81 are connected in the vehicle widthwise direction by the bumper beam cover 91, their rigidity in the vehicle widthwise direction is enhanced.

Since the front grille support member 40 is provided with a front grille support 41 spanning the mounting parts 42 and 42 and the bumper face 3 is supported from behind by the bumper face support 44 of the front grille support 41, the rigidity of the bumper face 3 can be enhanced. In addition, since the front grille support 41 having the bumper face support 44 is connected at its lower wall 45 to the bumper beam cover 91 through the connecting parts 96, 96, . . . , this enhances the rigidity of the front grille support 41 and thereby enhances the rigidity of the bumper face 3 with higher reliability.

Furthermore, since the connecting parts 96, 96, . . . are formed in the same widthwise location as the ribs 3f, 3f, . . . provided in the bumper face opening 3a, this improves the appearance of the vehicle front end and prevents the connecting parts 96, 96, . . . from providing high air flow resistance and thereby deteriorating the cooling capacity of the radiator 6.

Since the front grille support member 40 is not only provided with the bumper face cover 91 but also integrally provided with the side seals 81 and 81 and the front grille support 41, this enhances mountability as compared with the case of separately mounting these components.

Other Embodiments

The configuration of the present invention is not limited to those of the above embodiments and embraces other various configurations. Specifically, although in Embodiment 1 the auxiliary support member 33 is formed substantially in the shape of the letter V in top view and its distal ends are connected to the mounting flanges 31c and 31c of the center stay 31, the configuration of the auxiliary support member is not limited to this. For example, the auxiliary support member may be formed in a bar shape and connected to either one of the mounting flanges 31c and 31c. In this case, the rigidity of the grille support member 32 in the vehicle front-to-rear direction can be enhanced.

Although in each of the above embodiments the positioning jig 50 for positioning the bonnet lock 21 to the shroud panel 2 includes a center stay positioning part 61 in order to also enable the positioning of the center stay 31, the center stay 31 may be positioned in any other way. For example, the machining precision of the mounting holes formed in the mounting flanges 31c and 31c of the center stay 31 may be improved to a degree to allow the positioning of the center stay 31 and the mounting flanges 31c and 31c may be fastened together with the base plate 22 of the bonnet lock 21. Specifically, if the center stay 31 cannot accurately be positioned only with reference to the positions of the mounting holes of the center stay 31 as it may occur, for example, in the case of first machining the mounting holes and then shaping the center stay, it is necessary like the above embodiments to provide the center stay positioning part 61 on the jig 50. However, if the mounting holes of the center stay 31 are machined with high precision to a degree to allow an accurate positioning of the center stay with reference to the positions of the mounting holes, the center stay can be assembled in the designed position by simply fastening it together with the bonnet lock 21 without using any jig. This provides simplified structure of the jig and improved assemblability.

Although in the above embodiments the shroud panel 2 is a resin molded article, it is not limited to this but, for example, the shroud upper part may be made of metal.

Although in Embodiment 3 the front grille support 41 includes a lower wall 45, the front grille support may not include the lower wall 45 or may be composed of the shelf 43, the bumper face support 44 and the side walls 46.

Although in Embodiment 3 the front grille support 41 includes reinforcement inside ribs 48, 48, . . . and reinforcement ribs 49, 49, . . . , it may not include these ribs but may enhance its rigidity by increasing the thicknesses of the shelf 43, the bumper face support 44, the lower wall 45 and the side walls 46.

Although in Embodiment 3 the plurality of outside ribs 47, 47, . . . formed on the top of the shelf 43 of the front grille support 41 have the same height, they may have different heights to conform to the bottom of the front grille 1. Specifically, instead of forming the shelf 43 of the front grille support 41 to conform to the bottom of the front grille 1, the shelf 43 may be formed flat and the outside ribs 47, 47, . . . may have different heights to conform to the bottom of the front grille 1. In this case, the support shelf 80 provided on the rear parts of the outside ribs 47, 47, . . . are also formed, according to the heights of the outside ribs 47, 47, . . . , in a shape that its widthwise middle part sinks downward.

Although in Embodiment 3 the support shelf 80 is provided on the rear parts of a plurality of outside ribs 47, 47, . . . formed on the front grille support member 40 and supports the front grille 1, the front grille support member 40 may support the bottom of the front grille 1 on the outside ribs 47, 47, . . .

without providing the support shelf 80. In this case, since the front grille 1 is supported by the plurality of outside ribs 47, 47, ... in line contact with it, the surface precision required for the front grille support member 40 is further decreased as compared with the case of supporting the front grille 1 on the support shelf 80, thereby further improving the productivity of the front grille support member 40.

Although in Embodiment 3 the front grille support 41, the side seals 81, 81 and the bumper beam cover 91 of the front grille support member 40 are integrally formed, the side seals 81, 81 may be provided separately from the others.

Although in Embodiment 3 the bumper beam cover 91 is integrally provided with the side seals 81, 81 and the front grille support 41, it is not limited to this configuration. For example, the bumper beam cover 91 may be provided with mounting parts for the shroud panel 2 and the side seals and the front grille support may be separate members.

What is claimed is:

1. A front end structure for a vehicle comprising:
   a front bumper face;
   a shroud upper disposed to the rear of the front bumper face;
   a bumper beam disposed below the shroud upper to span the front ends of right and left front side frames;
   a center stay made of metal and spanning the shroud upper and the bumper beam;
   a front grille supported at the upper side to the shroud upper and supported at the lower side to the front bumper face, the front grille being inclined so that the lower side is located frontwardly of the upper side; and
   the center stay being integrally provided with a grille support including a root end connected to the center stay and an abutment supporting part extending from the root end towards the bottom of the front grille to support the front grille from below.

2. The front end structure of claim 1, further comprising
   a bumper retainer disposed so that at least part thereof abuts on the back of the front bumper face, the bumper retainer being fixedly connected at the lower side to the front bumper face, the bumper retainer abutting at the upper side against the front grille from below to support the front grille,
   wherein the grille support is configured so that the abutment supporting part abuts on an upper part of the bumper retainer from below to support the bumper retainer.

3. The front end structure of claim 2, wherein
   a surface of the bumper retainer is provided with a plurality of vertical ribs each extending in a front-to-rear direction of the vehicle and arranged in a widthwise direction of the vehicle to come into contact with the back of the front bumper face and a shelf connecting the rear ends of the vertical ribs in the widthwise direction of the vehicle, and
   the front grille is supported from below by the shelf.

4. The front end structure of claim 1, wherein
   the bumper beam is disposed frontwardly of the shroud upper,
   the center stay is disposed so that a bumper beam side mounting part thereof is located frontwardly of a shroud upper side mounting part thereof, and
   the grille support extends upward from the vicinity of the bumper beam side mounting part of the center stay.

5. The front end structure of claim 4, wherein the center stay is integrally provided with an auxiliary support that connects the shroud upper side mounting part of the center stay to part of the grille support located between the abutment supporting part and the root end.

6. The front end structure of claim 5, wherein the grille support further includes a guide located frontwardly of the abutment supporting part and extending frontward and downward.

7. The front end structure of claim 6, wherein the auxiliary support includes a second guide located frontwardly of part thereof connected to the grille support and extending frontwardly and upwardly of the abutment supporting part of the grille support.

8. The front end structure of claim 5, wherein the auxiliary support further includes a restriction wall located frontwardly of part thereof connected to the grille support and extending in the front-to-rear direction at a predetermined distance upwardly from the abutment supporting part of the grille support.

9. The front end structure of claim 5, wherein
   the shroud upper side mounting part of the center stay has right and left flanges extending to the right and left, respectively, from a vertically extending body of the center stay, and
   the auxiliary support is formed in the shape of the letter V in top view, one of distal ends of the auxiliary support being fixed to one of the right and left flanges, the other distal end of the auxiliary support being fixed to the other of the right and left flanges, a root end of the auxiliary support being fixed to the grille support.

10. The front end structure of claim 1, wherein
    the shroud upper is a part of a resin shroud to which a bonnet lock is mounted using a jig, and
    the center stay is positioned to the shroud by a center stay positioning part provided on the jig.

11. The front end structure of claim 1, wherein
    the shroud upper is a part of a resin shroud to which a bonnet lock is mounted using a jig, and
    the shroud upper side mounting part of the center stay is fastened together with the bonnet lock.

12. The front end structure of claim 1, wherein an impact sensor is mounted to the shroud upper side mounting part of the center stay.

13. The front end structure of claim 12, wherein at least one of the grille support and the auxiliary support has a vulnerable site vulnerable to load in the front-to-rear direction.

14. A front end structure for a vehicle comprising:
    a front bumper face;
    a shroud disposed to the rear of the front bumper face and including at least an upper part and right and left side parts;
    a front grille supported at the upper side to the shroud and supported at the lower side to the front bumper face, the front grille being inclined so that the lower side is located frontwardly of the upper side; and
    a front grille support member including right and left mounting parts mounted to the right and left side parts of the shroud, respectively, and a shelf connecting the right and left mounting parts, formed to protrude frontward at a spanning part thereof connecting the right and left mounting parts and supporting the front grille from below.

15. The front end structure of claim 14, wherein
    the top of the shelf is provided with a plurality of ribs extending in a front-to-rear direction of the vehicle and arranged in a widthwise direction of the vehicle and a second shelf connecting the rear ends of the ribs in the widthwise direction of the vehicle, and
    the front grille is supported from below by the second shelf.

16. The front end structure of claim 14, wherein
  the front bumper face extends frontward and downward from in front and the horizontal level of the shelf, and
  the front grille support member is positioned with the front end of the shelf in the vicinity of the back of the front bumper face and further includes a bumper face support extending frontward and downward from the front end of the shelf along the back of the bumper face.

17. The front end structure of claim 16, wherein the front grille support member further includes right and left side walls connecting both the widthwise ends of the bumper face support to the right and left mounting parts.

18. The front end structure of claim 17, wherein the side walls and the mounting parts are provided with reinforcement ribs extending in the front-to-rear direction of the vehicle across each associated pair of said side wall and said mounting part.

19. The front end structure of claim 17, wherein the front grille support member further includes a lower wall extending rearward from the lower end of the bumper face support and connected at its widthwise ends to the right and left side walls.

20. The front end structure of claim 19, wherein the front grille support member is formed in a cross section resembling a lateral letter U opening rearward by the shelf, the bumper face support and the lower wall and further includes inside reinforcement ribs provided on the inside across the shelf, the bumper face support and the lower wall to extend in the front-to-rear direction of the vehicle.

21. The front end structure of claim 14, wherein the front grille support member further includes a bumper beam cover provided at a predetermined distance downward from the lower wall to form an air inlet under the lower wall and a connecting part connecting the bumper beam cover and the lower wall.

22. The front end structure of claim 21, wherein
  a shock absorbing material is disposed on the front side of the bumper beam and supported at the rear side to the bumper beam, and
  the bumper beam cover is formed so that the front end thereof is located to the front end of the shock absorbing material, the front end of the bumper beam cover being provided with a plurality of engagement parts extending downward and engaged to the front side of the shock absorbing material.

23. The front end structure of claim 21, wherein a cushion is disposed between the bumper beam and the bumper beam cover.

24. The front end structure of claim 21, wherein the front grille support member further includes right and left seal plates extending upward from both the widthwise ends of the bumper beam cover to form right and left vertical walls between the right and left side parts of the shroud and the front bumper face.

25. The front end structure of claim 21, wherein
  an opening formed in the front bumper face is provided with a fin extending vertically, and
  the front grille support member further includes: a face support spanning the right and left mounting parts and supporting a face part located above the opening of the front bumper face; and a connecting part provided in the same widthwise location as the fin and connecting the bumper beam cover and the face support.

* * * * *